(12) United States Patent
McKenna, Jr.

(10) Patent No.: US 6,915,528 B1
(45) Date of Patent: Jul. 5, 2005

(54) SYSTEM AND METHOD FOR MANAGING TELEVISION PROGRAMS WITHIN AN ENTERTAINMENT SYSTEM

(75) Inventor: Thomas P. McKenna, Jr., Sammamish, WA (US)

(73) Assignee: Digeo, Inc., Kirkland, WA (US)

( * ) Notice: Subject to any disclaimer, the term of this patent is extended or adjusted under 35 U.S.C. 154(b) by 764 days.

(21) Appl. No.: 09/993,350

(22) Filed: Nov. 14, 2001

Related U.S. Application Data

(63) Continuation-in-part of application No. 09/909,468, filed on Jul. 19, 2001.

(51) Int. Cl.$^7$ ................................................ G06F 3/00
(52) U.S. Cl. ........................ 725/37; 725/40; 725/49; 725/51; 725/131; 725/134; 348/552; 348/553; 348/569
(58) Field of Search .......................... 725/37, 39, 85, 725/131, 133, 139, 141, 151, 153, 40, 47, 49, 51–54, 134; 345/761, 763, 764, 765; 348/552, 553, 569, 570, 705, 706

(56) References Cited

U.S. PATENT DOCUMENTS

| | | | |
|---|---|---|---|
| 4,706,121 A | 11/1987 | Young | 358/142 |
| 5,353,121 A | 10/1994 | Young et al. | 348/563 |
| 5,479,266 A | 12/1995 | Young et al. | 358/335 |
| 5,479,268 A | 12/1995 | Young et al. | 358/335 |
| 5,499,343 A | 3/1996 | Pettus | 395/200.2 |
| 5,532,754 A | 7/1996 | Young et al. | 348/569 |
| 5,630,131 A | 5/1997 | Palevich et al. | 395/701 |
| 5,649,105 A * | 7/1997 | Aldred et al. | 709/220 |
| 5,673,401 A * | 9/1997 | Volk et al. | 725/139 |
| 5,727,060 A | 3/1998 | Young | 380/10 |
| 5,768,539 A | 6/1998 | Metz et al. | 395/200.79 |
| 5,796,394 A | 8/1998 | Wicks et al. | 345/329 |
| 5,808,662 A * | 9/1998 | Kinney et al. | 348/14.1 |
| 5,809,204 A | 9/1998 | Young et al. | 386/83 |
| 5,870,150 A | 2/1999 | Yuen | 348/553 |
| 5,886,746 A | 3/1999 | Yuen et al. | 348/564 |
| 5,929,849 A | 7/1999 | Kikinis | 345/327 |
| 5,940,073 A | 8/1999 | Klosterman et al. | 345/327 |
| 5,970,206 A | 10/1999 | Yuen et al. | 386/83 |
| 5,974,222 A | 10/1999 | Yuen et al. | 386/83 |
| 5,987,509 A | 11/1999 | Portuesi | 709/217 |
| 6,018,768 A | 1/2000 | Ullman et al. | 709/218 |
| 6,182,094 B1 | 1/2001 | Humpleman et al. | 707/513 |
| 6,347,398 B1 | 2/2002 | Parthasarathy et al. | 717/11 |
| 6,389,466 B1 | 5/2002 | Zondag | 709/221 |
| 6,408,437 B1 | 6/2002 | Hendricks et al. | 725/132 |
| 6,671,882 B1 * | 12/2003 | Murphy et al. | 725/54 |
| 6,771,290 B1 * | 8/2004 | Hoyle | 345/745 |
| 2002/0009283 A1 | 1/2002 | Ichioka et al. | 386/46 |
| 2002/0013945 A1 | 1/2002 | Nashida et al. | 725/58 |
| 2002/0052747 A1 * | 5/2002 | Sarukkai | 704/270 |
| 2002/0052864 A1 | 5/2002 | Yamamoto | 707/1 |

FOREIGN PATENT DOCUMENTS

| | | | | |
|---|---|---|---|---|
| EP | 0 987 628 A2 | 3/2000 | | G06F/9/46 |
| WO | WO 00/26731 | 5/2000 | | G05B/19/042 |

* cited by examiner

Primary Examiner—Krista Bui
(74) Attorney, Agent, or Firm—Kory D. Christensen; Stoel Rives LLP

(57) ABSTRACT

Television programs are represented by program interface objects (PIOs) within an interactive television system. The PIOs provide a visual indicator for quick identification of the represented television program, attributes providing information concerning the represented television program, and actions that may be performed on or in connection with the represented television program. The PIOs may be sorted, filtered, and/or managed based on user-provided criteria. The PIOs may also be linked to allow an operation performable in connection to one PIO to be performed in connection with the linked PIO(s).

50 Claims, 25 Drawing Sheets

SYSTEM AND METHOD FOR MANAGING TELEVISION PROGRAMS WITHIN AN ENTERTAINMENT SYSTEM

RELATED APPLICATIONS

This application is a continuation-in-part of U.S. patent application Ser. No. 09/909,468, filed Jul. 19, 2001, for "Object Representation of Television Programs within an Interactive Television System," with inventor Thomas P. McKenna, Jr., which is hereby incorporated by reference.

FIELD OF THE INVENTION

The present invention relates generally to the field of interactive television systems. More specifically, the present invention relates to a system and method for managing television programs within an interactive television system.

DESCRIPTION OF RELATED BACKGROUND ART

Due to the ever-increasing number of channels offered by cable television and satellite networks, an electronic program guide (EPG) has become a common feature of many set top boxes (STBs). Conventional EPGs display schedule information for television programs in a grid-based format. One axis of the EPG typically corresponds to channels or stations, while the other axis corresponds to time slots. Rectangular elements formed within the grid represent specific television programs.

While EPGs have numerous advantages over conventional printed guides (such as TV Guide®), EPGs are still based on the channel/time slot model, which is of diminishing importance today. For example, where a viewer has access to over 500 channels, he or she is not interested in the fact that the latest episode of Friends® is being shown on Channel 498. Rather, the viewer would simply like to know when the program is being broadcast and allow the entertainment system to automatically switch to the appropriate channel.

With the advent of digital video recorders (DVRs), even the concept of broadcast time is becoming irrelevant. Ideally, a viewer would simply like to instruct the entertainment system to record the next episode of Friends®, which the viewer can then watch at a convenient time.

Forcing a viewer to search through a grid consisting, for example, of over 500 rows (corresponding to channels) and possibly thousands of columns (corresponding to time slots) is no longer acceptable. Given the wide variety of entertainment options and the limited amount of time available to individuals for entertainment, any advancement increasing the convenience of an entertainment system would be highly advantageous.

Accordingly, what is needed is a system and method that overcomes the problems and disadvantages of the prior art. In particular, the system and method should provide convenient access to available programming within an entertainment system without requiring the use of a conventional, grid-based EPG.

BRIEF DESCRIPTION OF THE DRAWINGS

Non-exhaustive embodiments of the invention are described with reference to the figures, in which.

DETAILED DESCRIPTION OF THE PREFERRED EMBODIMENTS

Figure 1:
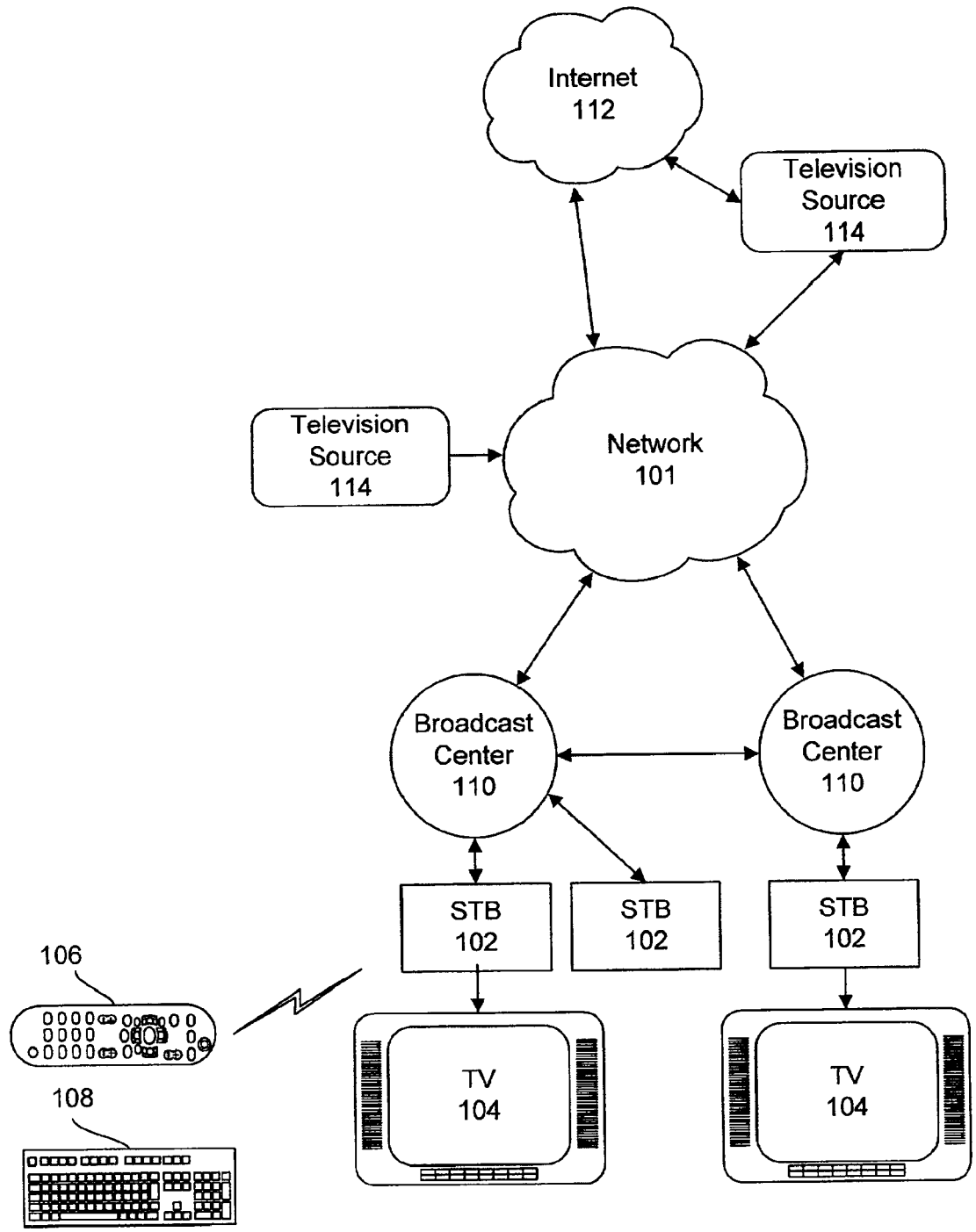
FIG. 1 is a block diagram of a communication system.

The present invention solves the foregoing problems and disadvantages by using program interface objects (PIOs) to represent television programs within an entertainment system, such as interactive television system.

In one embodiment, each PIO includes a plurality of actions and attributes. Actions correspond to various operations that may be performed on or in connection with the television program represented by the PIO. For example, one action may schedule the recording of the represented television program, while another action may play back the represented television program if it was previously recorded. Actions may be embodied as program code, in a machine-independent format, such as Java or Javascript, that may be executed, for example, by an STB for an interactive television system.

Attributes contain information about the television program represented by the PIO. For example, one attribute of a television program may correspond to the program's name, while another attribute may correspond to the program's broadcast time.

Certain attributes may contain meta-data relating to the PIO, the television program, or both. For example, one attribute may indicate the size of the corresponding PIO. Another attribute may indicate the encoding format of the television program.

Attributes may be used to sort, filter, prioritize, or otherwise organize a set of PIOs. Moreover, certain attributes may be used in the context of certain actions. For example, an action for recording a television program may need to access attributes containing the channel, starting time, and running time of the television program.

PIOs may be implemented using various technologies. For instance, a PIO may be implemented as a JavaBean object. Alternatively, a PIO may be embodied as a Distributed Component Object Model (DCOM) object or an eXtensible Markup Language (XML) object. The present invention is not limited to a particular object format.

In one implementation, each PIO also includes a visual indicator, such as an icon, which is displayed in a graphical user interface (GUI) to facilitate user interaction with the PIO. The GUI may display a plurality of visual indicators corresponding to a set of PIOs. Using a remote control or other selection mechanism, a user may select a PIO by its corresponding visual indicator. Further, a user may select an action associated with the PIO, which then may be executed by the STB.

In one embodiment, an STB or other system may be populated with visual indicators of a set of PIOs selected from a larger set of available PIOs. The set of available PIOs may be filtered based on user-defined filtering criteria. For example, a user may filter the set of available PIOs for ones relating to sporting events.

In certain embodiments, PIOs may be transmitted between interactive television systems, personal computers, mobile devices, and the like. For example, a PIO may be attached to an e-mail message and sent via the Internet to another system where it may be used to perform various actions on, or provide information concerning, a represented television program. Alternatively, a PIO may be sent via infrared (IR) or radio frequency (RF) transmission from one portable entertainment device, such as a Personal Digital Assistant (PDA), to another.

In one embodiment, a PIO may be used to provide supplemental information related to a television program. For example, an attribute may comprise a link to a web page associated with the television program. The PIO may be used to direct a browser to the web page indicated by the link. Alternatively, a PIO may include a link to an e-commerce website. The link may identify, for instance, a particular product associated with the television program. Furthermore, attributes of the PIO containing personal information about a user may be used to automatically initiate a sale for the identified product. In another configuration, a link of a PIO may connect a user to a chat room associated with the television program.

In another embodiment, at least two PIOs may be linked together such that an operation performed on one PIO may be performed on the linked PIO. Two or more PIOs may be linked based on user-defined criteria or shared attributes. The PIOs may be linked in various configurations, e.g., ring, chain, star, etc.

In certain configurations, the PIOs are linked within a single entertainment system. Alternatively, the PIOs may be linked between different entertainment systems connected to the same network. The linked PIOs may form groups of "favorites", or "play lists."

The linked PIOs allow an action performed on one PIO to be performed on all PIOs linked to the selected PIO. For example, a record action may be propagated from the selected PIO to all of the PIOs linked to the selected PIO. In certain configurations, a visual indicator of a linked PIO may be modified to alert a user that the PIO is linked to other PIOs.

Thus, PIOs are an alternative mechanism for providing access to available television programming and supplemental information using an interactive television system, without the necessity of a conventional EPG. A user need not be concerned with such details as channel or broadcast time, as was necessary in conventional systems. The user need only select an icon for a PIO and select the desired action.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, user selections, network transactions, database queries, database structures, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Referring now to FIG. 1, there is shown a communication system 100. In one implementation, the system 100 relies on a broadband network 101 for communication, such as a cable television network or a direct satellite broadcast (DBS) network, although other networks are possible.

The system 100 may include a plurality of set top boxes (STBs) 102 located, for instance, at customer homes or offices. Generally, an STB 102 is a consumer electronics device that serves as a gateway between a customer's television 104 and the network 101. In alternative embodiments, an STB 102 may be embodied more generally as a personal computer (PC), an advanced television 104 with STB functionality, or another type of client terminal.

An STB 102 receives encoded television signals and other information from the network 101 and decodes the same for display on the television 104 or other display device, such as a computer monitor. As its name implies, an STB 102 is typically located on top of, or in close proximity to, the television 104.

Each STB 102 may be distinguished from other network components by a unique identifier, number, code, or address, examples of which include an Internet Protocol (IP) address (e.g., an IPv6 address), a Media Access Control (MAC) address, or the like. Thus, video signals and other information may be transmitted from the network 101 to a specific STB 102 by specifying the corresponding address, after which the network 101 routes the transmission to its destination using conventional techniques.

A remote control 106 is provided, in one configuration, for convenient remote operation of the STB 102 and the television 104. The remote control 106 may use infrared (IR), radio frequency (RF), or other wireless technologies to transmit control signals to the STB 102 and the television 104. Other remote control devices are also contemplated, such as wired or wireless mice (not shown).

Additionally, a keyboard 108 (either wireless or wired) is provided, in one embodiment, to allow a user to rapidly enter text information into the STB 102. Such text information may be used for e-mail, instant messaging (e.g. text-based chat), or the like. In various embodiments, the keyboard 108 may use infrared (IR), radio frequency (RF), or other wireless technologies to transmit keystroke data to the STB 102.

Each STB 102 may be coupled to the network 101 via a broadcast center 110. In the context of a cable television network, a broadcast center 110 may be embodied as a "head-end", which is generally a centrally-located facility within a community where television programming is received from a local cable TV satellite downlink or other source and packaged together for transmission to customer homes. In one configuration, a head-end also functions as a Central Office (CO) in the telecommunication industry, routing video signals and other data to and from the various STBs 102 serviced thereby.

A broadcast center 110 may also be embodied as a satellite broadcast center within a direct broadcast satellite (DBS) system. A DBS system may utilize a small 18-inch satellite dish, which is an antenna for receiving a satellite broadcast signal. Each STB 102 may be integrated with a digital integrated receiver/decoder (IRD), which separates each channel, and decompresses and translates the digital signal from the satellite dish to be displayed by the television 104.

Programming for a DBS system may be distributed, for example, by multiple high-power satellites in geosynchronous orbit, each with multiple transponders. Compression (e.g., MPEG) may be used to increase the amount of programming that can be transmitted in the available bandwidth.

The broadcast centers 110 may be used to gather programming content, ensure its digital quality, and uplink the signal to the satellites. Programming may be received by the broadcast centers 110 from content providers (CNN®, ESPN®, HBO®, TBS®, etc.) via satellite, fiber optic cable and/or special digital tape. Satellite-delivered programming is typically immediately digitized, encrypted and uplinked to the orbiting satellites. The satellites retransmit the signal back down to every earth-station, e.g., every compatible DBS system receiver dish at customers' homes and businesses.

Some broadcast programs may be recorded on digital videotape in the broadcast center 110 to be broadcast later. Before any recorded programs are viewed by customers, technicians may use post-production equipment to view and analyze each tape to ensure audio and video quality. Tapes may then be loaded into a robotic tape handling systems, and playback may be triggered by a computerized signal sent from a broadcast automation system. Back-up videotape playback equipment may ensure uninterrupted transmission at all times.

Regardless of the nature of the network 101, the broadcast centers 110 may be coupled directly to one another or through the network 101. In alternative embodiments, broadcast centers 110 may be connected via a separate network, one particular example of which is the Internet 112. The Internet 112 is a "network of networks" and is well known to those skilled in the art. Communication over the Internet 112 is accomplished using standard protocols, such as TCP/IP (Transmission Control Protocol/Internet Protocol) and the like.

A broadcast center 110 may receive television programming for distribution to the STBs 102 from one or more television programming sources 114 coupled to the network 101. Preferably, television programs are distributed in an encoded format, such as MPEG (Moving Picture Experts Group). Various MPEG standards are known, such as MPEG-2, MPEG-4, MPEG-7, and the like. Thus, the term "MPEG," as used herein, contemplates all MPEG standards. Moreover, other video encoding/compression standards exist other than MPEG, such as JPEG, JPEG-LS, H.261, H.263, H.263++ and H.26L. Accordingly, the invention should not be construed as being limited only to MPEG.

Broadcast centers 110 may be used to enable audio and video communications between STBs 102. Transmission between broadcast centers 110 may occur (i) via a direct peer-to-peer connection between broadcast centers 110, (ii) upstream from a first broadcast center 110 to the network 101 and then downstream to a second broadcast center 110, or (iii) via the Internet 112. For instance, a first STB 102 may send a video transmission upstream to a first broadcast center 110, then to a second broadcast center 110, and finally downstream to a second STB 102.

Of course, the communication system 100 illustrated in FIG. 1 is merely exemplary, and other types of devices and networks may be used within the scope of the invention.

Figure 2:
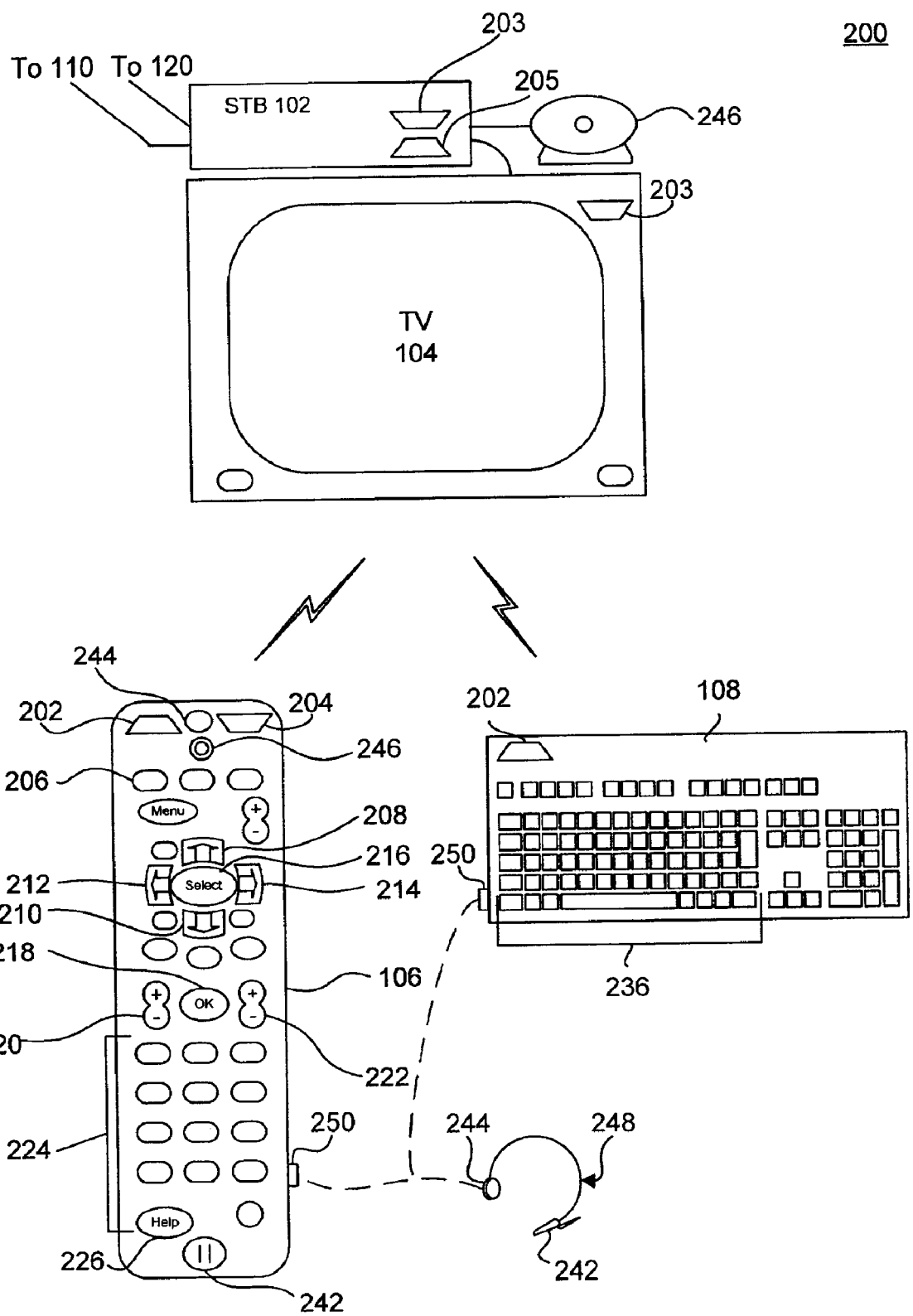
FIG. 2 is an illustration of an interactive television system.

Referring now to FIG. 2, there is shown an interactive television (ITV) system 200 according to an embodiment of the invention. As depicted, the system 200 may include an STB 102, a television 104 (or other display device), a remote control 106, and, in certain configurations, a keyboard 108.

The remote control 106 is provided for convenient remote operation of the STB 102 and the television 104. In one configuration, the remote control 106 includes a wireless transmitter 202 for transmitting control signals (and possibly audio/video data) to a wireless receiver 203 within the STB 102 and/or the television 104. In certain embodiments, the remote control 106 includes a wireless receiver 204 for receiving signals from a wireless transmitter 205 within the STB 102. Operational details regarding the wireless transmitters 202, 205 and wireless receivers 203, 204 are generally well known to those of skill in the art.

The remote control 106 preferably includes a number of buttons or other similar controls. For instance, the remote control 106 may include a power button 206, an up arrow button 208, a down arrow button 210, a left arrow button 212, a right arrow button 214, a "Select" button 216, an "OK" button 218, channel adjustment buttons 220, volume adjustment buttons 222, alphanumeric buttons 224, a "Help" button 226, and the like.

Figure 3:
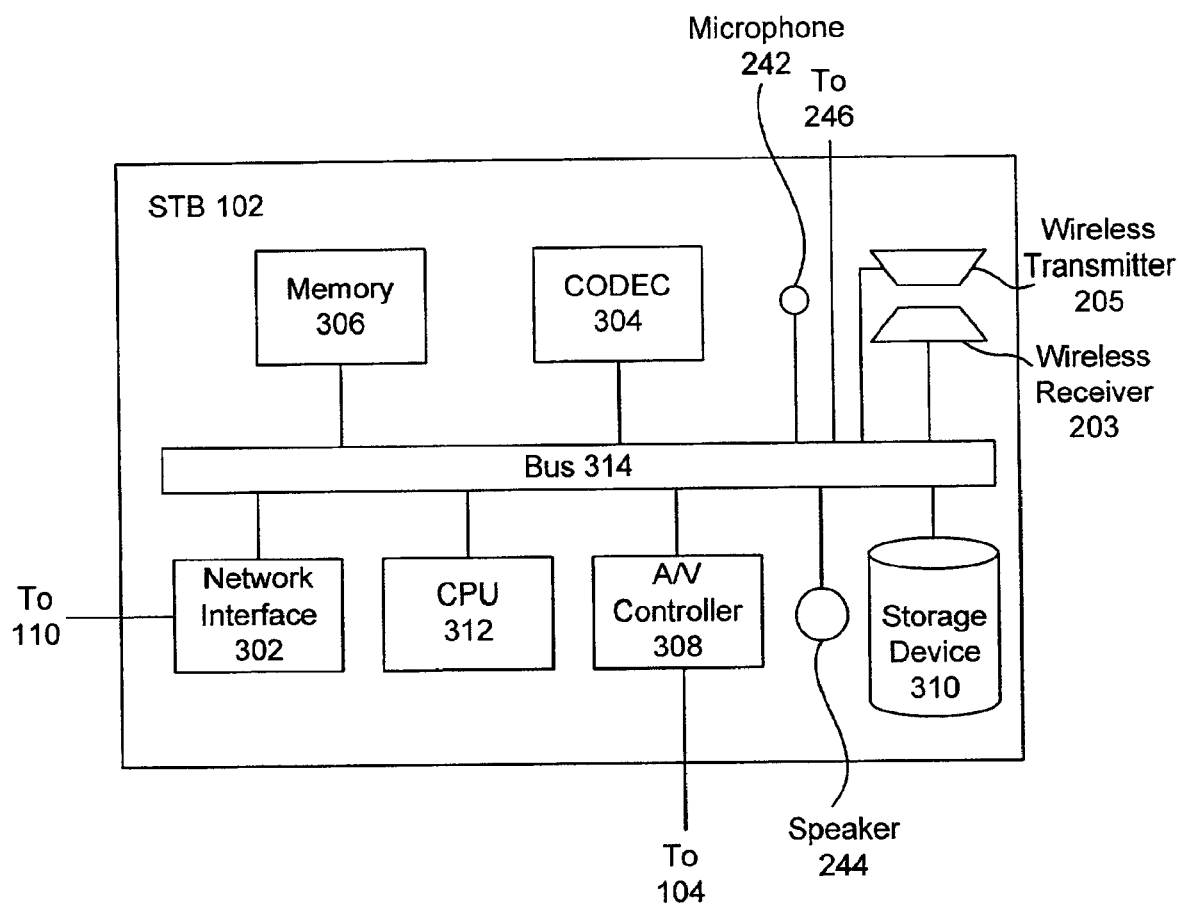
FIG. 3 is a block diagram of hardware components of a set top box (STB)

In one embodiment, the remote control 106 includes a microphone 242 for capturing audio signals. The captured audio signals may be transmitted to the STB 102 via the wireless transmitter 202. In addition, the remote control 106 may include a speaker 244 for generating audible output from audio signals received from the STB 102 via the wireless receiver 204. In alternative embodiments, as shown in FIG. 3, the microphone 242 and/or speaker 244 may be integrated with the STB 102.

In certain embodiments, the remote control 106 further includes a video camera 246, such as a CCD (chargecoupled device) digital video camera, for capturing video signals. In one implementation, the video camera 246 is in electrical communication with the wireless transmitter 202 for sending the captured video signals to the STB 102. Like the microphone 242 and speaker 244, the video camera 246 may be integrated with the STB 102, or attached to the STB 102, as in the depicted embodiment.

The various components of the remote control 106 may be positioned in different locations for functionality and ergonomics. For example, as shown in FIG. 2, the speaker 244 may be positioned near the "top" of the remote control 106 (when viewed from the perspective of FIG. 2) and the microphone 242 may be positioned at the "bottom" of the remote control 106. Thus, in one embodiment, a user may conveniently position the speaker 244 near the user's ear and the microphone 242 near the user's mouth in order to operate the remote control 106 in the manner of a telephone.

The optional keyboard 108 facilitates rapid composition of text messages. The keyboard 108 includes a plurality of standard alphanumeric keys 236. In one configuration, the keyboard 108 includes a wireless transmitter (not shown), similar or identical to the wireless transmitter 202 of the remote control 106. The wireless transmitter transmits keystroke data from the keyboard 108 to the STB 102. Additionally, the keyboard 108 may include one or more of the buttons illustrated on the remote control 106.

Alternatively, or in addition, a hands-free headset 248 may be coupled to the remote control 106 or the keyboard 108. The headset 248 may be coupled using a standard headset jack 250. The headset 248 may include a microphone 242 and/or speaker 244. Such a headset 248 may be used to reduce audio interference from the television 104 (improving audio quality) and to provide the convenience of hands-free operation.

Referring now to FIG. 3, there is shown a block diagram of physical components of an STB 102 according to an embodiment of the invention. As noted above, the STB 102 includes a wireless receiver 203 for receiving control signals sent by the wireless transmitter 202 in the remote control 106 and a wireless transmitter 205 for transmitting signals (such as audio/video signals) to the wireless receiver 204 in the remote control 106.

The STB 102 also includes, in one implementation, a network interface 302 for communicating with the network 101 via the broadcast center 110. The interface 302 may include conventional circuitry for receiving, demodulating, and demultiplexing MPEG packets. The interface 302 may also include conventional modem circuitry for sending or receiving data. For example, the interface 302 may conform to the DOCSIS (Data Over Cable Service Interface Specification) or DAVIC (Digital Audio-Visual Council) cable modem standards.

In one configuration, one or more frequency bands (for example, from 5 to 30 MHz) may be reserved for upstream transmission. Digital modulation (for example, quadrature amplitude modulation or vestigial sideband modulation) may be used to send digital signals in the upstream transmission. Of course, upstream transmission may be accomplished differently for different networks 101. Alternative ways to accomplish upstream transmission include using a back channel transmission, which is typically sent via an analog telephone line, ISDN, DSL, or other techniques.

The STB 102 also preferably includes a codec (encoder/decoder) 304, which serves to encode audio/video signals into a network-compatible data stream for transmission over the network 101. The codec 304 also serves to decode a network-compatible data stream received from the network 101. The codec 304 may be implemented in hardware and/or software. Moreover, the codec 304 may use various algorithms, such as MPEG or Voice over IP (VoIP), for encoding and decoding.

The STB 102 further includes a memory device 306, such as a random access memory (RAM), for storing temporary data. Similarly, a read-only memory (ROM) may be provided for storing more permanent data, such as fixed code and configuration information.

In one embodiment, an audio/video (A/V) controller 308 is provided for converting digital audio/video signals into analog signals for playback/display on the television 104. The A/V controller 308 may be implemented using one or more physical devices, such as separate graphics and sound controllers. The A/V controller 308 may include graphics hardware for performing bit-block transfers (bit-blits) and other graphical operations for displaying a graphical user interface (GUI) on the television 104.

In some implementations, the STB 102 may include a storage device 310, such as a hard disk drive, optical storage device, RAM, compact flash card, etc. The storage device 310 may be configured to store encoded incoming and outgoing video signals as well as television broadcasts and retrieve the same at a later time for display. The storage device 310 may be configured, in one embodiment, as a digital video recorder (DVR), enabling scheduled recording of television programs, pausing (buffering) live video, etc. The storage device 310 may also be used in various embodiments to store viewer preferences, parental lock settings, electronic program guide (EPG) data, passwords, e-mail messages, video messages, video greetings, and the like. In one implementation, the storage device 310 also stores an operating system (OS) for the STB 102, such as Windows CE® or Linux®.

As noted above, the STB 102 may include, in certain embodiments, a microphone 242 and a speaker 244 for capturing and reproducing audio signals, respectively. The STB 102 may also include or be coupled to a video camera 246 for capturing video signals. These components may be included in lieu of or in addition to similar components in the remote control 106, keyboard 108, and/or television 104.

A CPU 312 controls the operation of the STB 102, including the other components thereof, which are coupled to the CPU 312 in one embodiment via a bus 314. The CPU 312 may be embodied as a microprocessor, a microcontroller, a digital signal processor (DSP) or other device known in the art. For instance, the CPU 312 may be embodied as an Intel® x86 processor. As noted above, the CPU 312 may perform logical and arithmetic operations based on program code stored within the memory 306 or the storage device 310.

Of course, FIG. 3 illustrates only one possible configuration of an STB 102. Those skilled in the art will recognize that various other architectures and components may be provided within the scope of the invention. In addition, various standard components are not illustrated in order to avoid obscuring aspects of the invention.

Figure 4:
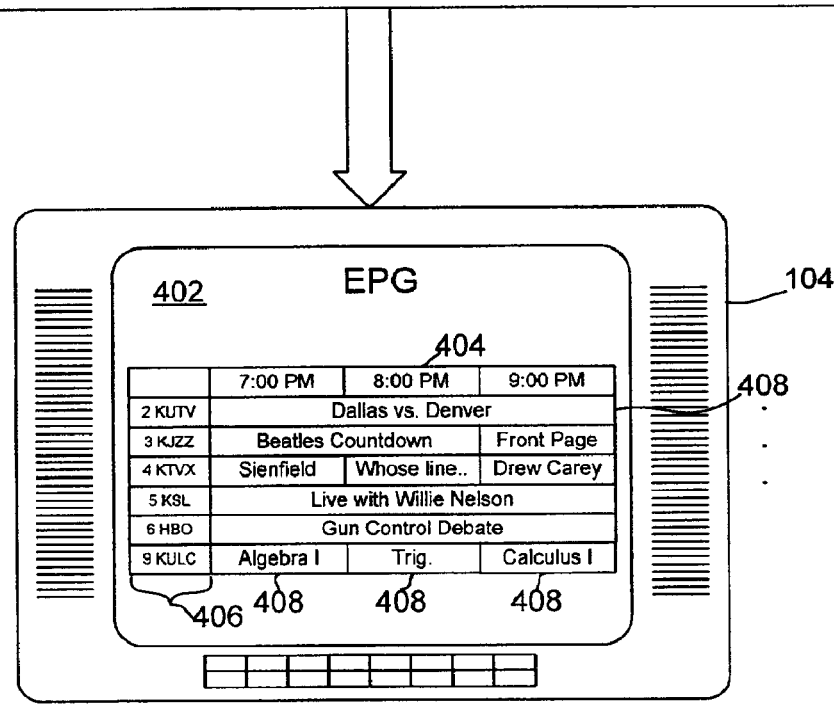
FIG. 4 illustrates a conventional electronic program guide (EPG)

FIG. 4 illustrates one implementation of a conventional Electronic Programming Guide (EPG) 402. As noted above, a typical EPG 402 includes a grid having two axes, one for time slots 404 and the other for channels or stations 406. Rectangular elements 408 formed within the grid correspond to specific television programs.

Generally, the navigation interface for a conventional EPG 402 is awkward and ill-suited to entertainment systems having more than a few channels. For example, a satellite STB may receive more than 500 channels, requiring the user to scroll through many pages of information to locate a desired program. Clearly, a conventional EPG 402 is based on the channel/time slot model, which is of diminishing relevance today.

For example, where a viewer has access to over 500 channels, he or she is not in interested in the fact that the latest episode of Friends® is being shown on Channel 498. Rather, the viewer would simply like to know when the program is being broadcast and allow the entertainment system to automatically switch to the appropriate channel.

With the advent of digital video recorders (DVRs), even the concept of broadcast time is becoming irrelevant. Ideally, a viewer would like instruct the entertainment system to record the next episode of Friends®, which the viewer can then watch at a convenient time.

In conventional systems, the EPG 402 may be generated from a text data file 410 or the like containing raw schedule information. For example, each program element 408 in the EPG 402 may correspond to one or more lines in the text data file 410. Unfortunately, storing raw schedule information in this manner severely limits the way in which the information may be used and communicated. For example, each system that receives the text data file 410 must be programmed to parse and display the information in a user-friendly format. The file 410, itself, does not include code or resources for using or displaying the information.

Figure 5:
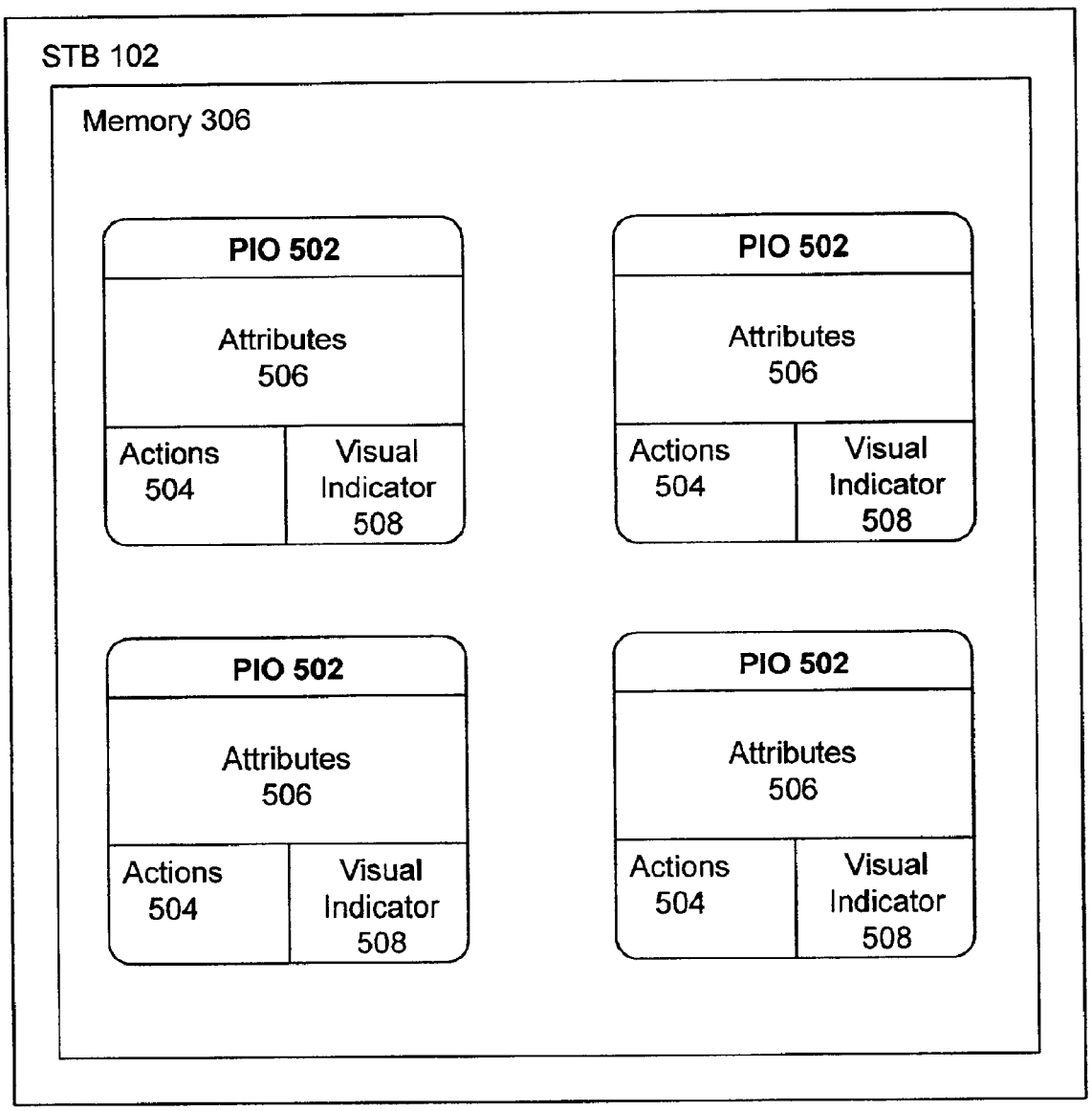
FIG. 5 is a block diagram of a plurality of program interface objects (PIOs) within a memory of an STB.

FIG. 5 illustrates an alternative to the conventional EPG 402 in accordance with principles of the present invention. In one embodiment of the invention, program interface objects (PIOs) 502 are used to represent television programs within an entertainment system, such as an interactive television system 200. In the depicted embodiment, a plurality of PIOs 502 are stored within a memory 306 of an STB 102. However, various other systems and devices may be used to store PIOs 502, such as personal digital assistants (PDAs), webpads, personal computers, and the like.

As noted above, a PIO 502 may include a plurality of actions 504 and attributes 506. In one embodiment, actions 504 correspond to various operations that may be performed on or in connection with the television program represented by the PIO 502. For example, one action 504 may schedule the recording of the represented television program, while another action may display the represented television program if it was previously recorded or is currently in progress. Of course each PIO 502 may include a different set of actions 504 permitting the PIOs 502 to be sorted and categorized based on the different defined actions 504.

Actions 504 may be embodied as program code, in a machine-independent format, that may be executed, for example, by an STB 102 for an interactive television system. Alternatively, actions 504 may include resources that are used by program code within a STB 102 or the like.

Attributes 506 contain information about the television program represented by the PIO 502. For example, one attribute 506 may correspond to a television program's name, while another attribute 506 may correspond to the program's broadcast time. Certain attributes 506 may contain meta-data related to the PIO 502, the represented television program, or both. For example, one attribute 506 may indicate the size of the PIO 502. Another attribute 506 may indicate the video encoding format of the represented television program.

As described more fully hereafter, attributes 506 may be used to sort, filter, search, prioritize, or otherwise organize a set of PIOs 502. Moreover, certain attributes 506 may be used in the context of certain actions 504. For example, an action 504 for recording a television program may need to access the attributes 506 containing the channel, starting time, and running time of the television program.

Each of the attributes 506 in a PIO 502 may include a triplet of information, e.g., the attribute name (Program Title, Program Broadcast Time, Program Broadcast Channel), the attribute's type (searchable text, time, executable code, GIF image, ATVEF triggers and their time mark within the program, MIME, or the like), and the attribute's value. In some cases, attributes 506 may include text in multiple languages to allow the PIO 502 to be used in different countries around the world.

PIOs 502 may be implemented using various technologies. For instance, a PIO 502 may be implemented as a JavaBean object. Alternatively, a PIO 502 may be embodied as a Distributed Component Object Model (DCOM) object or an extensible Markup Language (XML) object.

In one implementation, each PIO 502 also includes a visual indicator 506, such as an icon, animated image, or video clip, which is displayed in a graphical user interface (GUI) to facilitate user interaction with the PIO 502. As illustrated in subsequent figures, the GUI may display a plurality of visual indicators 508 corresponding to a set of PIOs 502. Using a remote control 106 or other selection mechanism, a user may select a PIO 502 by its corresponding visual indicator 508. Further, a user may select an action associated with the PIO 502 to be executed by the STB 102.

In one embodiment, PIOs 502 include program code in a substantially machine-independent format. For example, JavaBean, DCOM, or XML objects generally do not require proprietary hardware so long as the hardware executes a Java Virtual Machine (JVM), a DCOM server, an XML processor, or the like. The PIOs 502 may be created using a variety of programming languages and protocols, such as Java, C++, Smalltalk, and other programming languages that support object-oriented programming.

Machine independence allows the PIOs 502 to be portable. Information and functionality associated with a particular television program are encapsulated within the PIOs 502. PIOs may be transferred between STBs 102 or other devices, such as personal computers and hand-held devices. PIOs 502 may also be stored in computer-readable media, such as CDs, diskettes, memory cards, memory sticks, or the like.

Of course, PIOs 502 may be configured in various ways, and may be referred to using different terms, while still being considered within the scope of the invention. For example, "actions" may be termed "methods" or "functions", and "attributes" may be referred to as "variables", "state", or "data".

Figure 6:
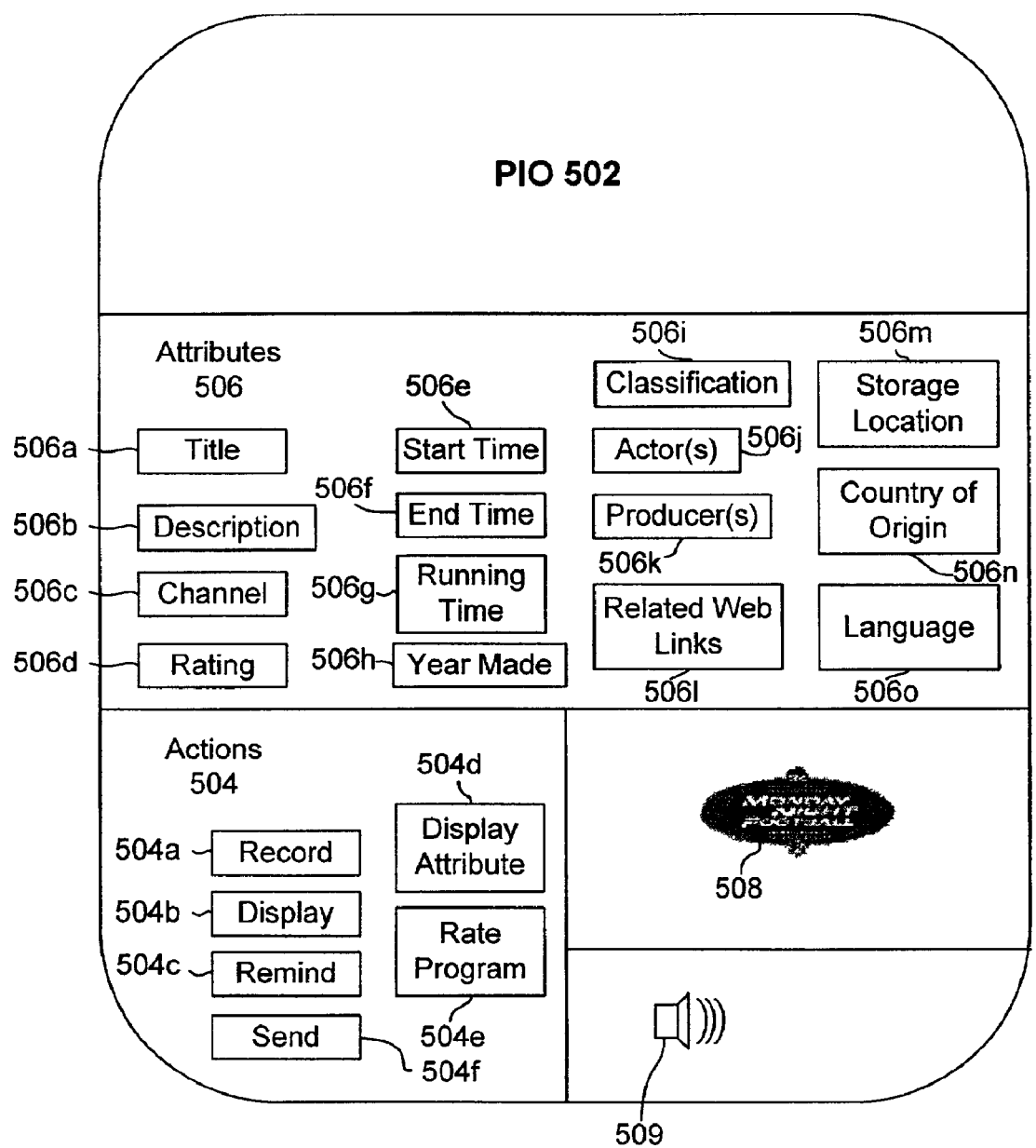
FIG. 6 is an expanded block diagram of a PIO.

FIG. 6 illustrates an expanded view of a PIO 502 including examples of attributes 506, actions 504, and visual indicators 508. For instance, a typical PIO 502 may include such attributes 506 as title 506a, description 506b, broadcast channel 506c, rating 506d (e.g., TV-G, TV-PG), start time 506e, end time 506f, running time 506g, release year 506h, classification 506i (e.g., drama, sit-com, sports), actor(s) 506j, producer(s) 506k, related Internet links 506l, storage location 506m, country of origin 506n, language 506o, etc. Of course, various other attributes 506 may be provided within the scope of the invention.

In some cases, attributes 506 may be embodied as references to external data in the form of hyperlinks or the like. For example, where a start time 506e attribute contains a fixed start time (e.g., 8:00 pm), an STB 102 may not be able to account for scheduling changes by a television source 114. Thus, in certain embodiments, the start time attribute 506e (and other such attributes 506), may include a link to a server (not shown) that contains the up-to-date start time for the television program. Thus, scheduling changes reflected in the server will be automatically recognized by all corresponding PIOs 502. This is particularly advantageous in the context of a sports game that goes into overtime. For example, the STB 102 can get updates from the broadcaster, allowing the STB 102 to extend the duration of the recording of the program.

In other embodiments, one or more attributes 506 of a PIO 502 may be dynamically updated based on (possibly real-time) updates from a broadcaster using a transmission method that can be specified in the PIO 502. The transmission methods can include, for instance, HTTP, FTP, e-mail, or an ATVEF trigger.

One particularly advantageous attribute 506 is the related Internet links attribute 506l. The related Internet links attribute 506l may link a PIO 502 to an associated web site (e.g., a sponsored link), a chat room (e.g., real time chat about the television program being watched), or an e-commerce site.

In certain embodiments, one attribute 506 may comprise a link (not shown) to one or more other PIOs 502. This facilitates PIO linking, which is advantageous, for example, in the context of related PIOs 502, e.g., a mini-series. PIO linking allows PIOs 502 to be associated based on characteristics besides those defined within the actions 504 and attributes 506 of each PIO 502. For example, PIOs 502 may be linked based on movies and television programs which discuss the subject of water rights in the western United States. Consequently, a PIO 502 for the movie "Chinatown," with actor Jack Nicholson, may be linked to a PIO 502 for "Rider of Destiny," with actor John Wayne.

A typical PIO 502 may also include various actions 504, such as an action 504a for recording the associated television program. As described more fully below, the recording action 504a may operate in conjunction with the CODEC 304 and storage device 310 of FIG. 3 to digitally record the television program when it is broadcast by a television source 114 or streaming video source 116. In addition, the recording action 504 may access the channel, start time, end time, and/or running time attributes 506c, 506e–g in order to facilitate the recording. The instantiation of a PIO 502 as stored in the STB memory 306 may contain additional, or updated data and may not be exactly the same as the originally broadcast PIO 502. The recording action 504a is an example of this dynamic update of the stored copy of the PIO 502.

An action 504b may also be provided for displaying the represented television program on a television 104. If, for instance, the television program is currently being broadcast, the display action 504b may be configured to tune the STB 102 to the correct channel. If, however, the television program was previously broadcast and recorded (e.g., by the record action 504a), the display action 504b may retrieve and display the stored television program. In one embodiment, the display action 504 accesses the storage location 506m attribute to locate a stored television program.

Various other actions 504 may include an action 504b for reminding a user that a particular program is scheduled to be broadcast and/or reminding the user that the program has been recorded. Additionally, an action 504d may be provided for displaying one or more attributes 506 of the PIO 502 on the television 104 or other display device. Moreover, an action 504e may be included to allow a user to rate and/or comment on the represented television program. An action 504f may also be provided to send a copy of the PIO 502 to another system or device.

In some cases, actions 504 may be propagated between linked PIOs 502. For example, a user may selection the record action 502a of a PIO 502 corresponding to a program in a mini-series. If the PIOs 502 of the mini-series are linked (e.g., by an appropriate attribute 506 or the like), then the same action 506a may be executed by the linked PIOs 502 as well.

Of course, numerous other attributes 506 and actions 504 may be provided within the scope of the invention. Moreover, the object-oriented nature of a PIO 502 allows for additional actions 504 and attributes 506 to be dynamically added as necessary.

The PIO 502 may also include a visual indicator 508, such as a graphical icon, to facilitate interaction with the PIO 502 in the context of a GUI. A visual indicator 508 may alternatively, or in addition, include a textual description of the television program, such as the program's name.

A graphical visual indicator 508 is advantageous in that it overcomes language and illiteracy barriers presented by conventional EPGs 402. For example, a child user may be unable to read a text description. However, a Big Bird® icon would be clearly recognizable as representing Sesame Street®.

In certain embodiments, a PIO 502 may include an audible indicator 509. The audible indicator 509 may include, for example, a description of the television program associated with the PIO 502 (similar to the description attribute 506b), an advertisement, user instructions, theme music for the television program or the like. The audible indicator 509 may be embodied as an audio clip or sample, which is played back by the STB 102 when the PIO 502 is selected or when the corresponding visual indicator 506 is displayed. The inclusion of an audible indicator 509 is advantageous for people who are visually disabled or those who have difficulty reading.

Figure 7:
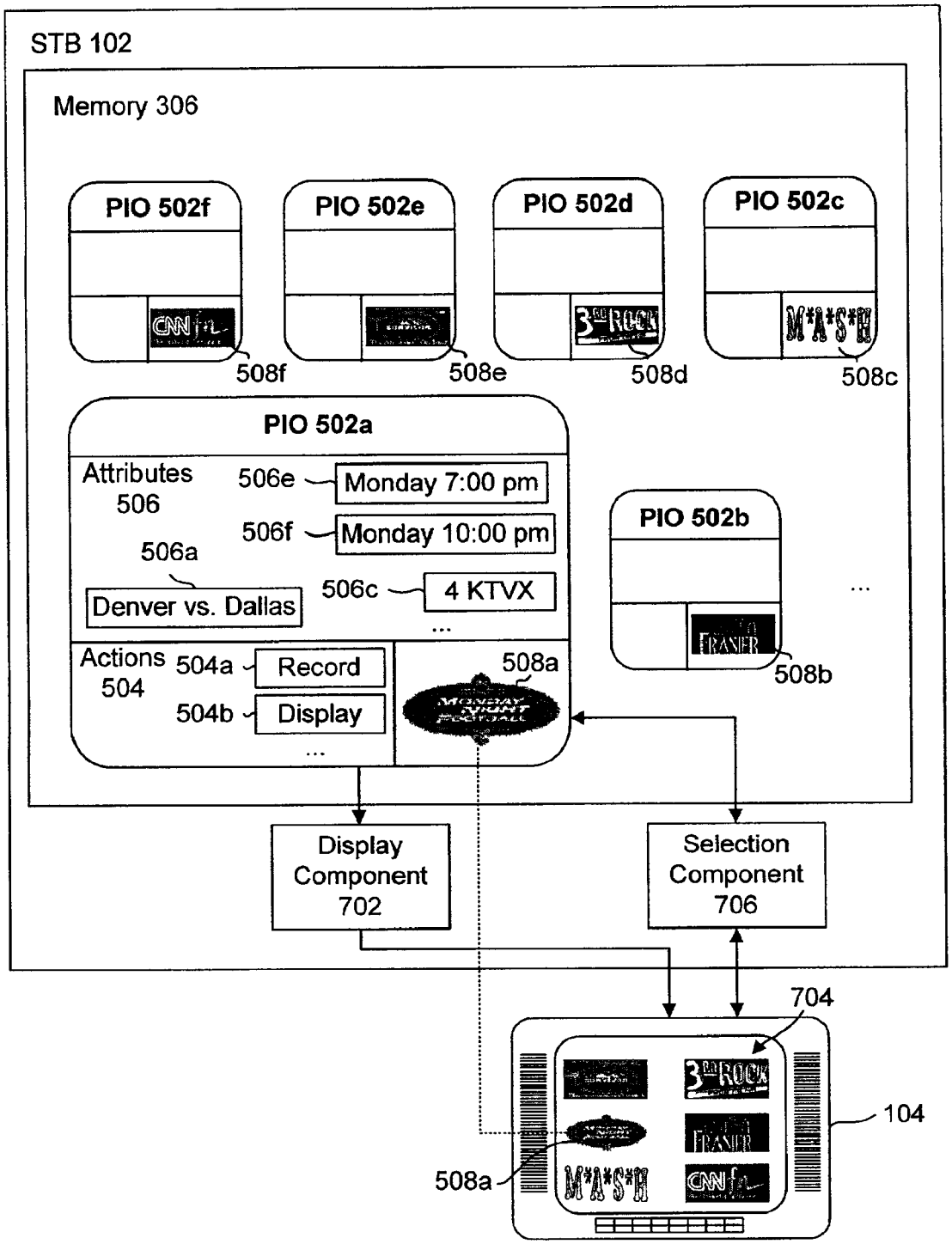
FIG. 7 is a block diagram of a system utilizing PIOs to represent television programs.

Referring now to FIG. 7, there is shown a block diagram of logical components of a system 700 that utilizes PIOs 502 to represent television programs. The depicted logical components may be implemented using one or more of the physical components shown in FIG. 3. Additionally, or in the alternative, various logical components may be implemented as software modules stored in the memory 306 and/or storage device 310 and executed by the CPU 312.

In one configuration, a plurality of PIOs 502a–f may be stored within a memory, such as a memory 306 of an STB 102. A display component 702 displays each visual indicator 508 of a PIO 502 on a television 104 or other display device. The visual indicators 508 may be displayed in connection with a GUI 704.

In certain embodiments, the displayed visual indicators 508a–f may be grouped in the GUI 704 within logical folders or the like, allowing a user to organize the visual indicators 50a–f in any desired manner. For example, a user may group visual indicators 508a–f within such folders as "My sit-coms", "My TV dramas", "My sports", etc., to facilitate easy access thereto.

As described more fully below, a selection component 706 allows a user to select one or more PIOs 502 by selecting corresponding visual indicators 508. Thereafter, the selection component 706 allows a user to choose one of the actions associated with the selected PIO 502. The selection of an action 504 may be accomplished via a context-sensitive menu or other suitable mechanism, as illustrated below.

As an example, suppose a PIO 502*a* includes a number of attributes 506, such as a title attribute 506*a* (e.g., "Dallas v. Denver"), a channel attribute 506*c* ("4 KTVX"), a start time attribute 506*e* (e.g., "Monday, 7:00 pm"), and an end time attribute 506*f* ("Monday, 10:00 pm"). Further, suppose that the PIO 502*a* includes a record action 504*a*, a display action 504*b*, and an iconic visual indicator 508*a*.

Figure 8:
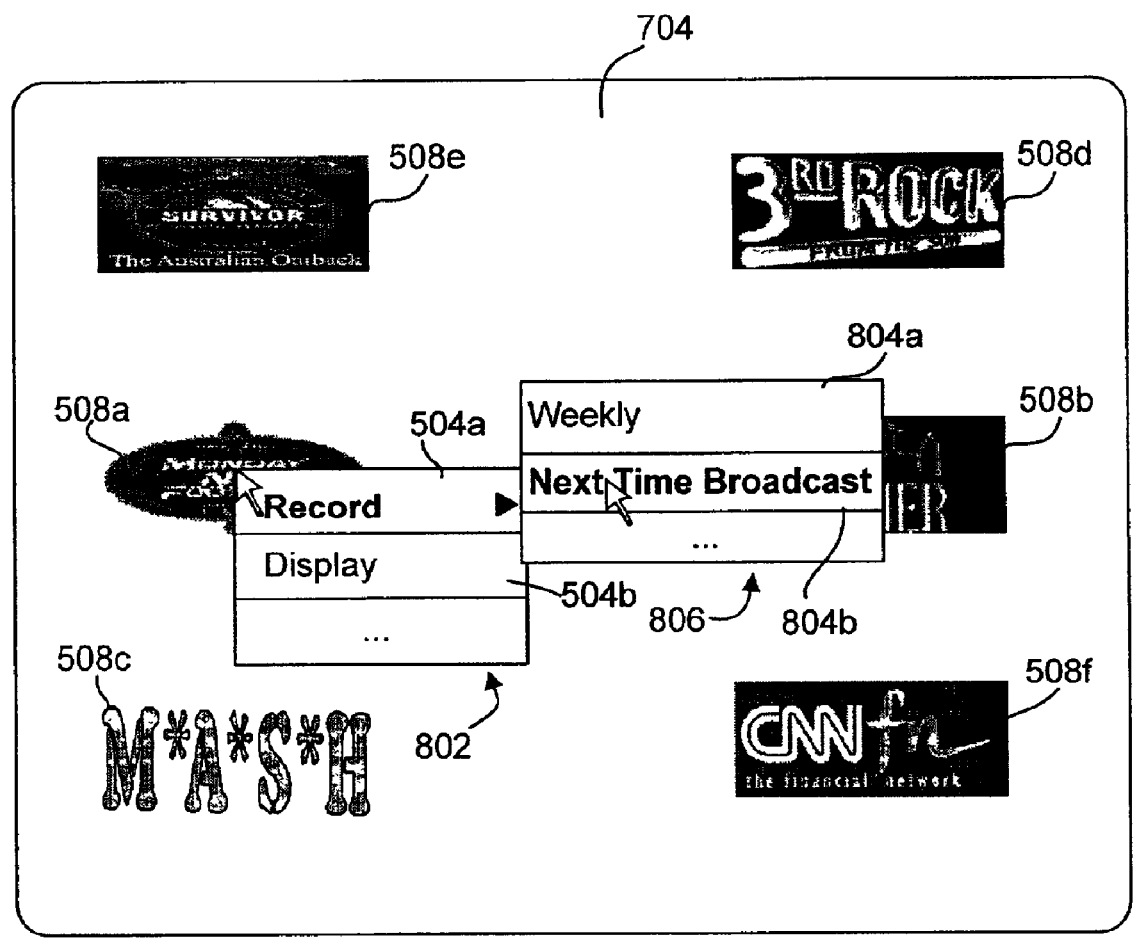
FIG. 8 is a user interface for interacting with PIOs.

FIG. 8 illustrates an exemplary GUI 704 including visual indicators 508*a–f* corresponding to the PIOs 502*a–f* of FIG. 7. In the illustrated embodiment, a user selects visual indicator 508*a* using, for example, the arrow buttons 208–214 of the remote control 106. A pointer, selection outline, or other mechanism may be used to pick the desired indicator 508*a*.

In response to the selection, a context-sensitive menu 802 may be displayed listing the available actions 504*a–b* for the PIO 502*a*. Where a large number of actions 504 are available, the menu 802 may display only the most popular or common actions 504, while providing a mechanism to display additional actions if desired.

In some cases, selecting an action 504 may result in the display of various options 804 in the form of a sub-menu 806. The options 804 may correspond to various parameters, features, or settings used by the corresponding action 504. For example, the record action 504*a* may include two options 804*a–b*, corresponding to record "Weekly" and record "Next Time Broadcast." If the "Next Time Broadcast" option 804*b* is selected, for instance, the record action 504*a* may record the next episode of a television program, as opposed to recurring weekly episodes (in the case of TV drama or sit-com).

Of course, different selection mechanisms may be provided other than the context-sensitive menu 802 and sub-menu 806. For example, the selection component 706 may display a plurality of user-selectable icons (not shown) corresponding to different actions 504 and options 804.

Because each PIO 502 may be tailored to a particular television program, the actions 504 available in the context-sensitive menu 802 may vary from program to program. Similarly, options 804 available in a sub-menu 806 for a particular action 504 may vary from one program to the next.

Figure 9:
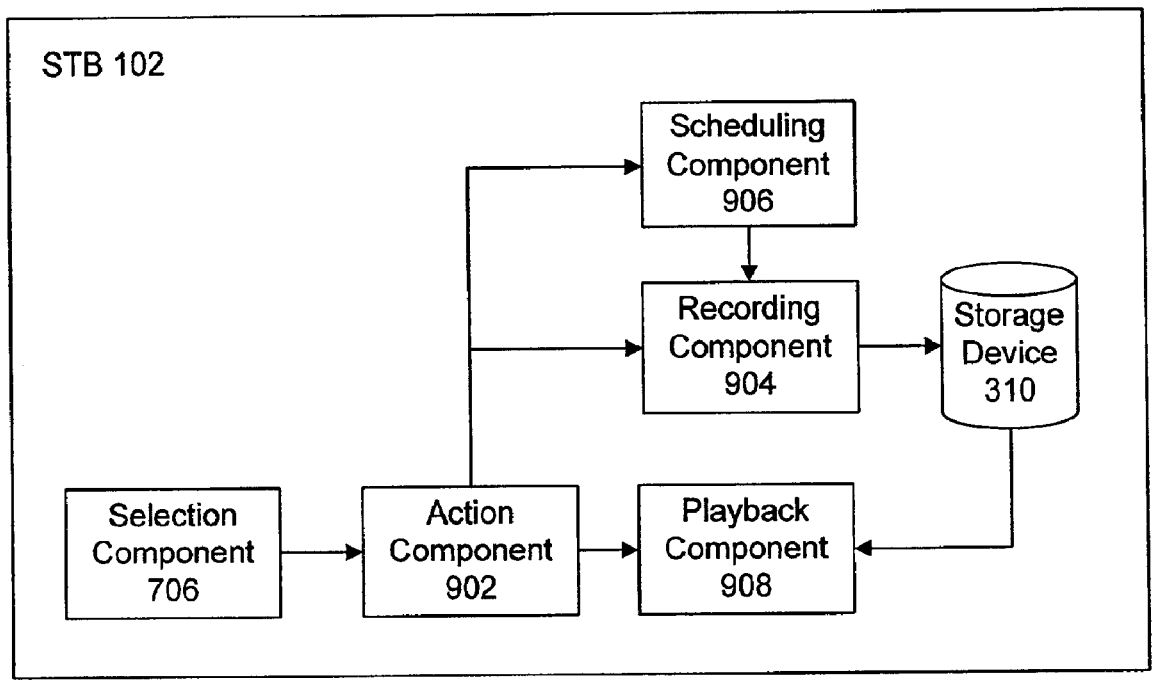
FIG. 9 is a block diagram of various functional modules for processing actions associated with a PIO.

Referring to FIG. 9, the STB 102 may further include an action component 902 that executes a user-selected action 504. The action component 902 may be implemented, in various embodiments, in the context of a Java Virtual Machine (JVM), a DCOM server, XML processor, or the like. Of course, other implementations are possible.

To execute the selected action 504, the action component 902 may interact with various other logical components of the STB 102, such as a recording component 904, a scheduling component 906, and a playback component 908, as described below.

Briefly, the recording component 904 is configured to record a television program using, for example, the storage device 310. The scheduling component 906 schedules recording tasks to record television programs to be broadcast in the future. In addition, the scheduling component 906 interacts with the recording component 904 to record a desired television program at the correct time and date in accordance with a scheduled recording task. The playback component 908 is configured, in one embodiment, to display a television program stored within the storage device 310 or the like. Each of the above-described components may be implemented in the context of a digital video recording (DVR) system, one example of which is TiVo®, available from TiVo, Inc.

Figure 10:
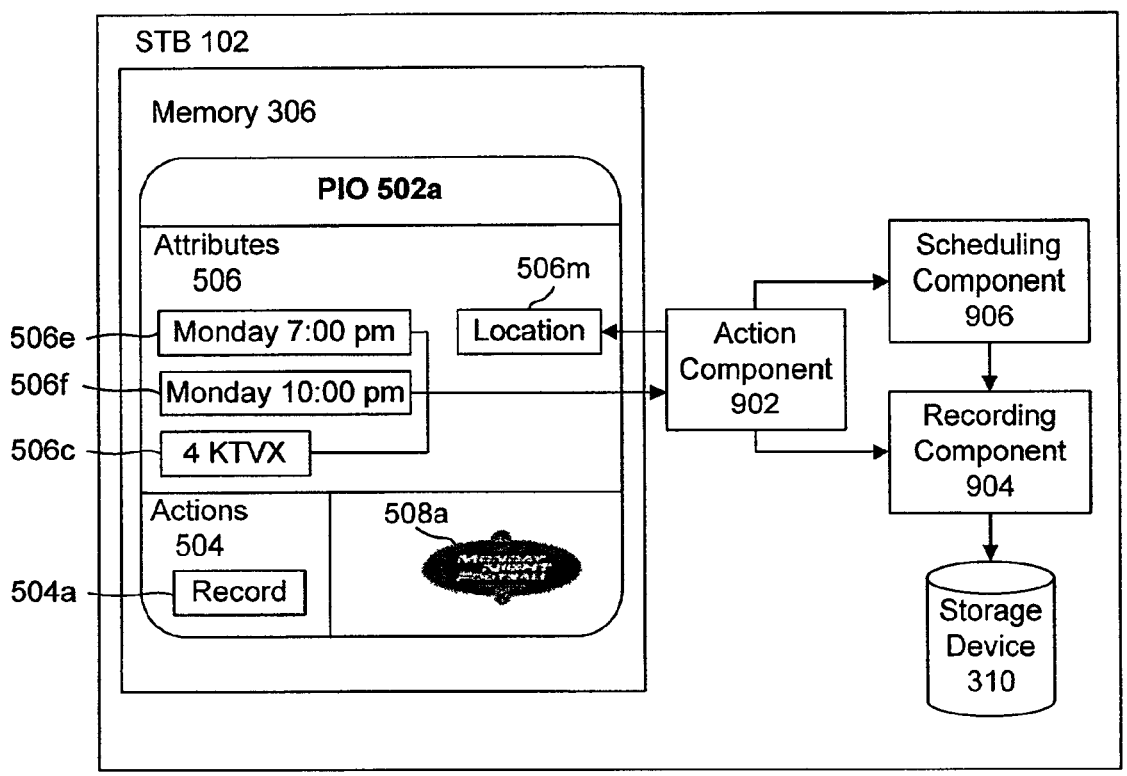
FIG. 10 is a block diagram illustrating use of a PIO to record an associated television program.

Suppose, as shown in FIG. 8, that a user selects the record action 504*a* with the "Next Time Broadcast" option 804*b*. In response to such selection, and as illustrated in FIG. 10, the starting time 506*e*, ending time 506*f*, and channel 506*c* attributes may be provided to the scheduling component 906. Thereafter, the scheduling component 906 schedules a recording event to record the television program. At the specified time and date, the scheduling component 906 instructs the recording component 904 to record the television program on the specified channel.

The recorded television program may be stored within the storage device 310 of the STB 102 or another suitable location. After the program is recorded, the stored location of the television program may be placed in the storage location attribute 506*m* of the PIO 502*a* to allow subsequent access thereto.

Figure 11:
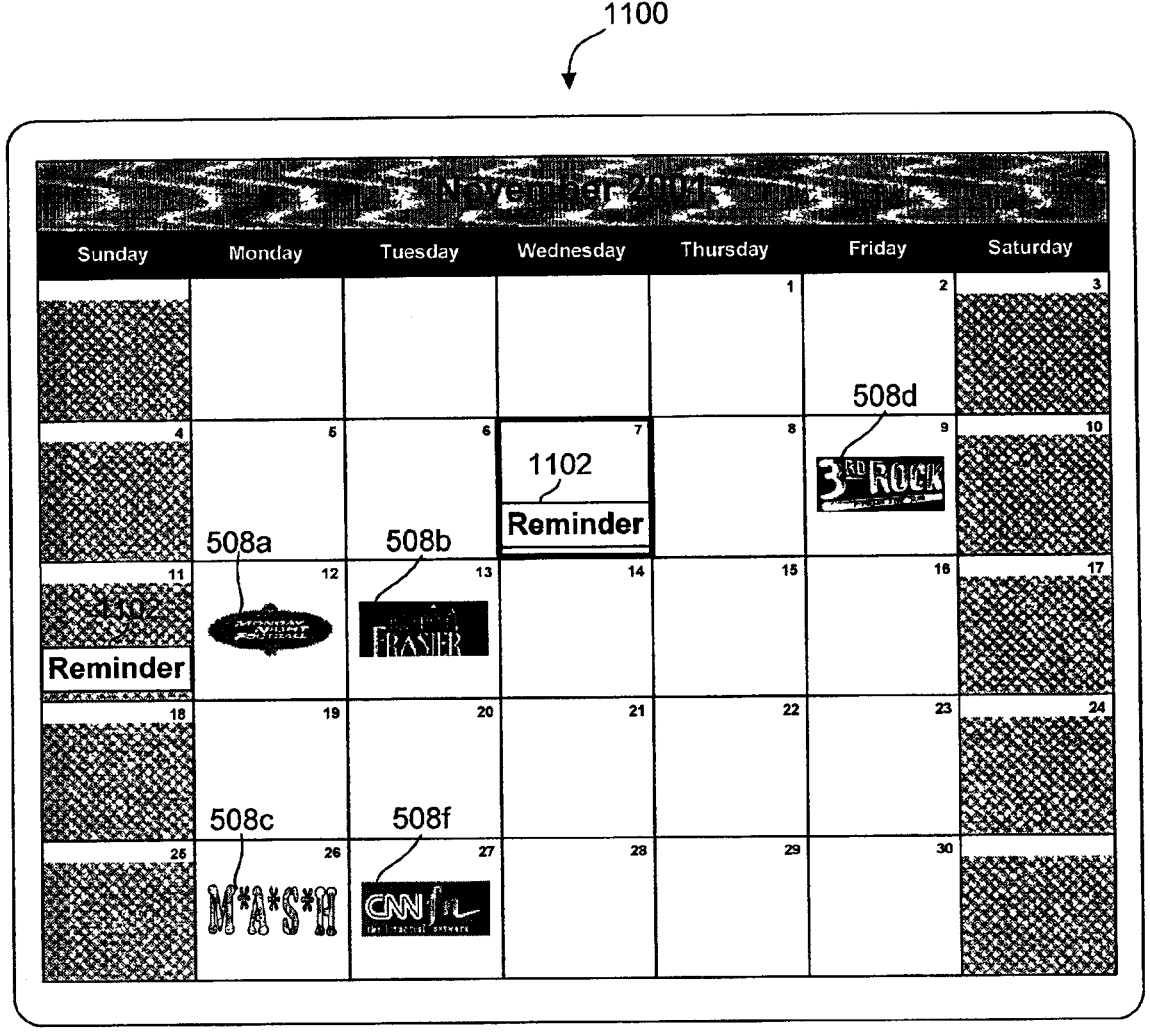
FIG. 11 is a user interface illustrating visual indicators of PIOs within a calendar.

FIG. 11 illustrates use of PIOs 502 in the context of a personal information manager (PIM) 1100, such as an adapted version of Microsoft® Outlook®. In one embodiment, when a television program represented by a PIO 502 is scheduled for recording, the scheduling component 906 interacts with the PIM 1100 to display a visual indicator 508 of the PIO 502 in a calendar, to-do list, or the like, provided by the PIM 1100.

Moreover, in one implementation, the scheduling component 906 inserts reminders 1102 into the PIM 1100 to notify users concerning scheduled recordings. Similarly, reminders 1102 of upcoming television programs may be noted on the calendar a day or two prior to the broadcast date. In this manner, a user may quickly see which television programs he or she plans to watch.

In certain embodiments, PIOs 502 may be dragged and dropped onto the PIM 1100 using object linking and embedding (OLE), DCOM, ActiveX, or the like. A result of dropping a PIO 502 on the PIM 1100 may be to schedule the program represented by the PIO 502 for recording.

While FIG. 11 illustrates use of PIOs 502 in a PIM 1100, the object-oriented nature of the PIOs 502 allows them to interface with a variety of software applications. Moreover, PIOs may be used with a variety of electronic devices, including personal computers, cell phones, personal digital assistants (PDAs), pagers, telephones, and the like. The portable nature of the PIOs 502 and flexibility available provide for a variety of uses for the PIOs 502. For example, an action 504 may exist to call a user and deliver a voice synthesized reminder 1102 one hour prior to a broadcast of the associated television program. The possibilities for actions 504 are endless.

Figure 12:
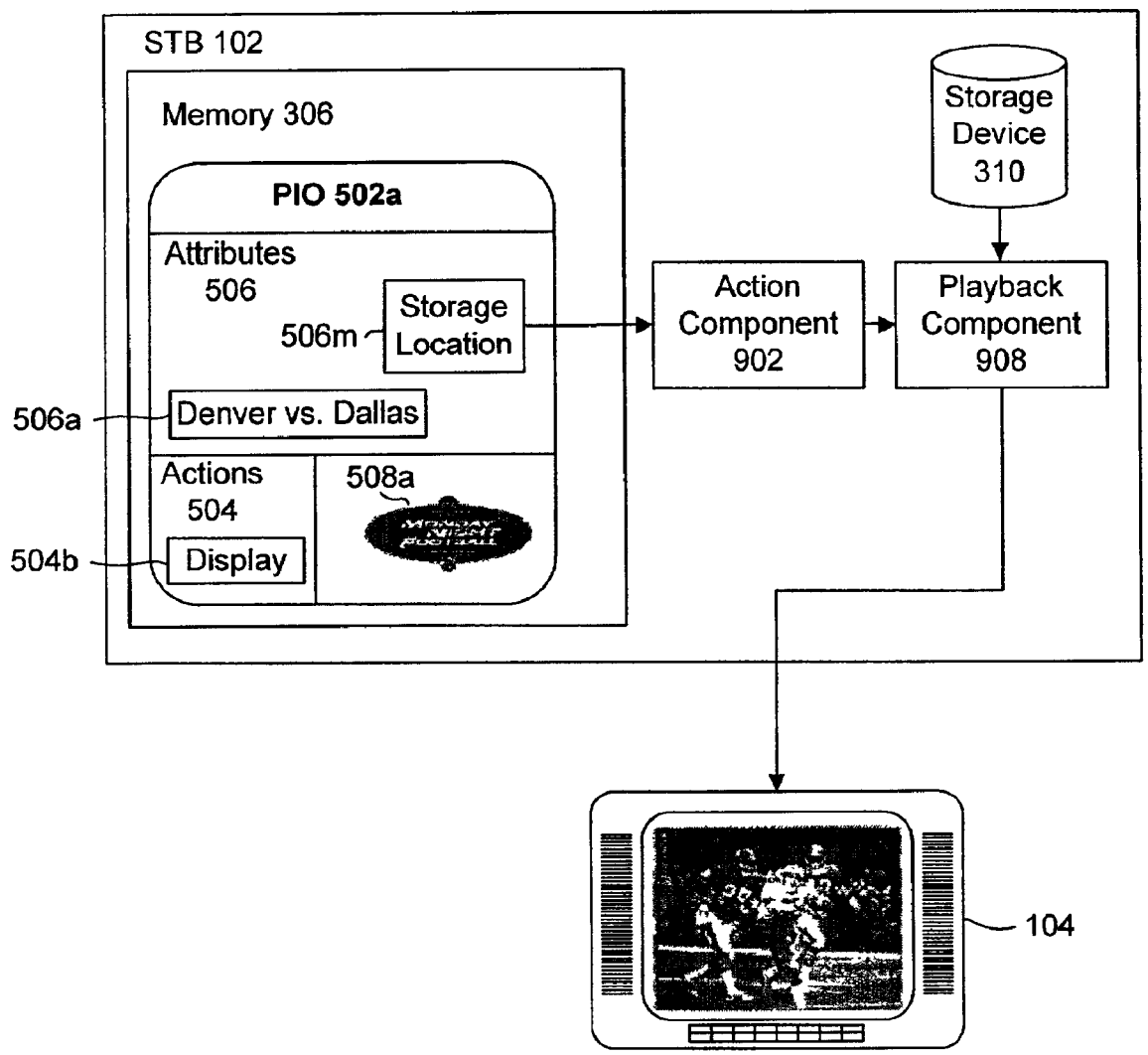
FIG. 12 is a block diagram illustrating use of a PIO to display a previously recorded television program.

As shown in FIG. 12, once a television program is recorded, it may be retrieved and displayed in response to a user selection of the display action 504*b* shown in FIG. 8. In one embodiment, the location of the recorded television program is retrieved from the stored location attribute 506*m* and provided to the playback component 908. Thereafter, the playback component 908 retrieves the recorded program and plays back the same on the television 104.

Figure 13:
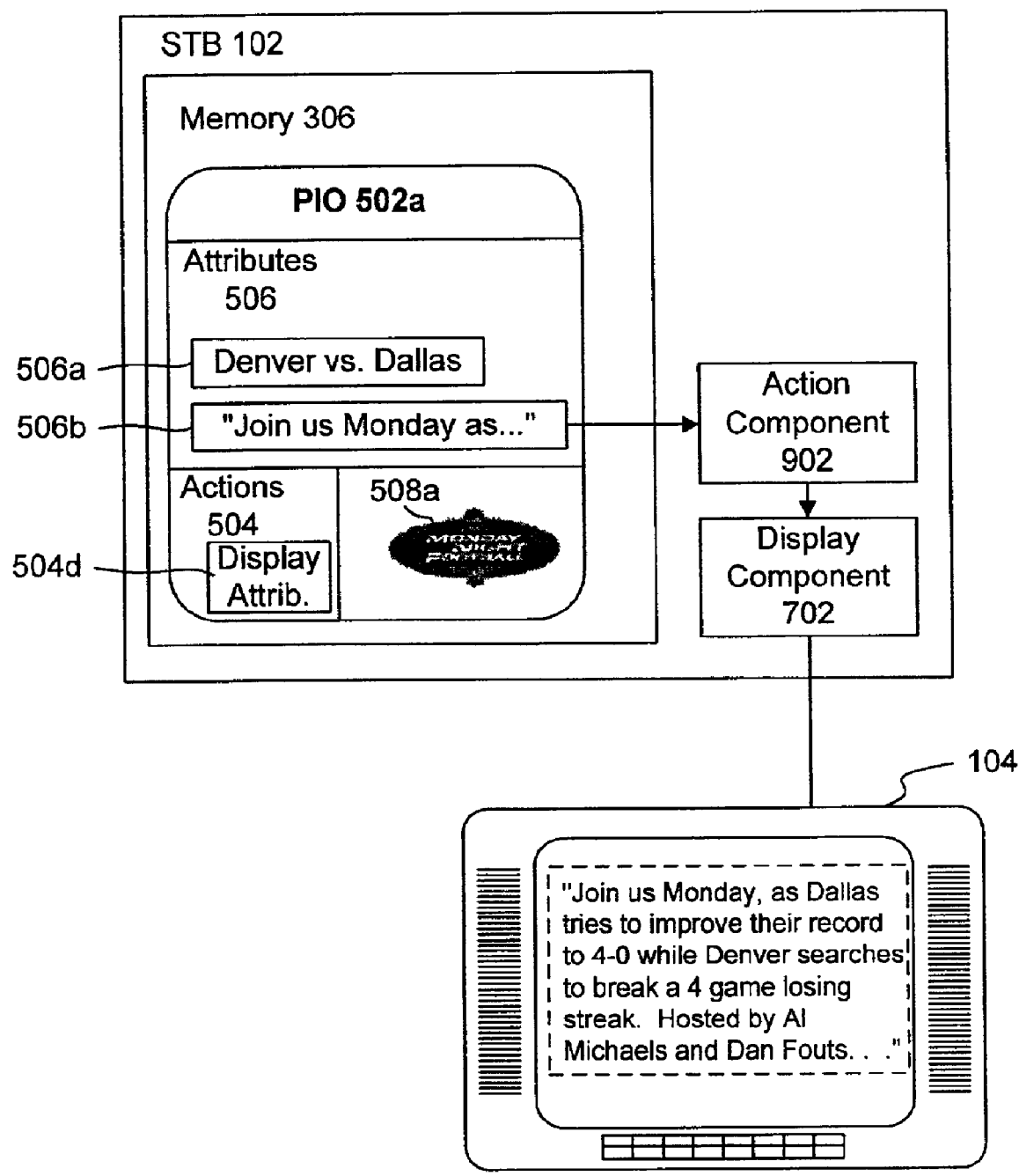
FIG. 13 is a block diagram illustrating display of an attribute of a PIO.

As shown in FIG. 13, an action 504*d* may be provided for displaying one or more of the attributes of a PIO 502. The action 504*d* and the desired attribute(s) 506 may be selected using the context-sensitive menu 802 and sub-menu 806 illustrated in FIG. 8, although the invention is not limited in this respect.

Suppose, for example, that a user selects the display attribute action 504d with the description attribute 506b. In one embodiment, the description attribute 506b is retrieved from the PIO 502 and provided to the display component 702 or the like for display. In various embodiments, a selected attribute 506 may include text, audio, video, or the like. Thus, the various modules not shown but well known in the art may be required for displaying or playing back the selected attribute 506.

Figure 14:
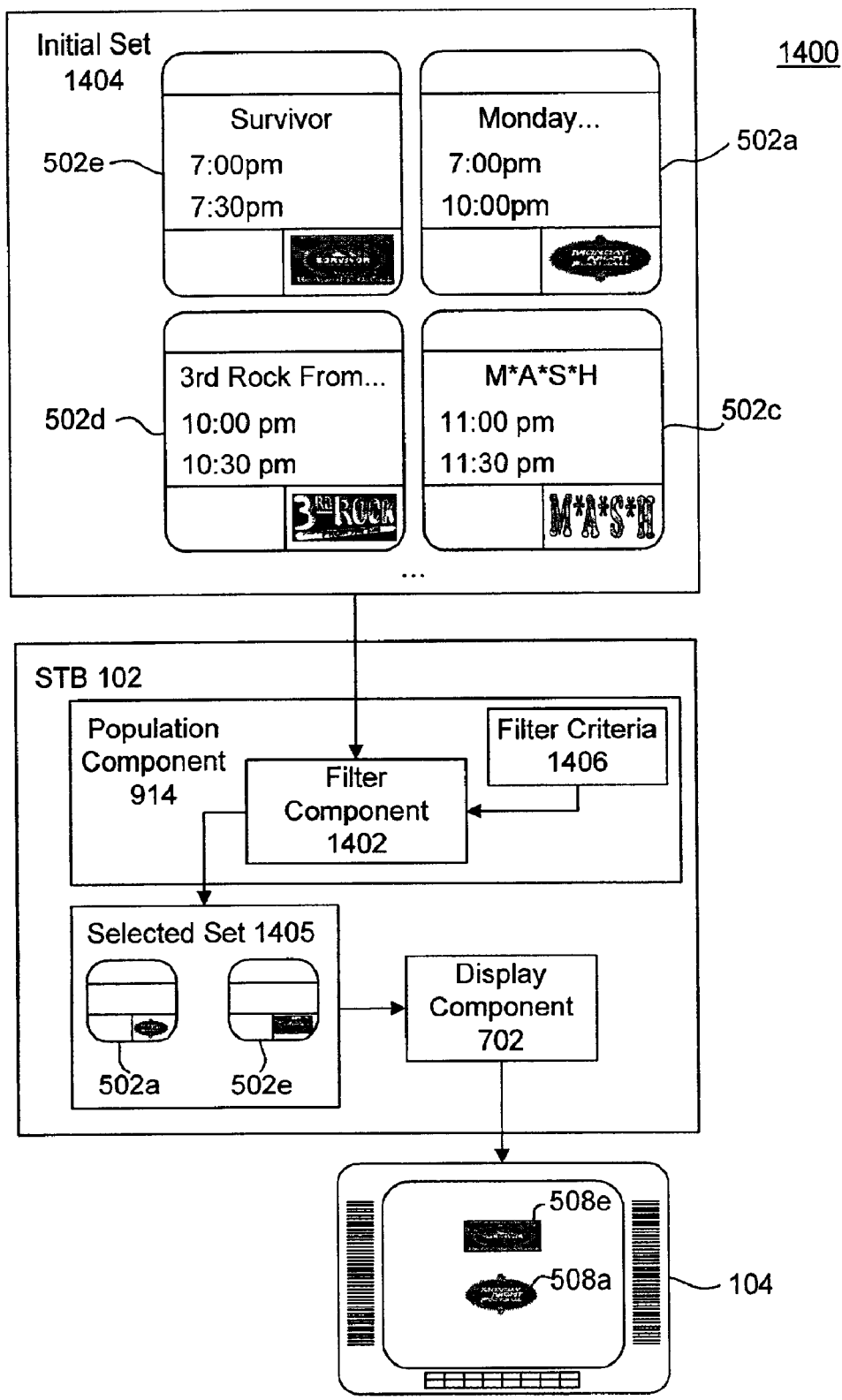
FIG. 14 is a block diagram of a system for filtering a set of PIOs according to user-defined filtering criteria.

FIG. 14 illustrates an embodiment of a system 1400 providing a set of PIOs 502 to an interactive television system 200. PIOs 502 may be available from a variety of sources including, for example, a broadcast center 110, a television source 114 (such as a television network), a PIO server (not shown), and the like. The PIOs 502 may be transmitted from these sources, across a network 101, the Internet 112, or other network connection, including a satellite link, to an STB 102.

In the depicted embodiment, a population component 914 is provided for populating an STB 102 or the like with a user-selected set of PIOs 502. The population component 914 may be implemented within the STB 102 (as shown), within a broadcast center 110, or the like.

In one embodiment, the population component 914 provides a filter component 1402 for reducing an initial set 1404 of available PIOs 502 to a user-specified set 1405 that may be stored within the STB 102. In certain embodiments, the initial set 1404 may include hundreds or thousands of PIOs 502 associated with corresponding television programs. Thus, reducing the initial set 1404 to a more manageable set 1405 is generally desirable.

The filter component 1402 may include or be associated with filtering criteria 1406. The filtering criteria 1406 may comprise a set of user-defined rules for filtering the initial set 1404. For example, a user may specify that the population component 914 only retrieve PIOs 502 having a start time 506e of 7:00 pm or an end time 506f of 10:00 pm (e.g., primetime). Alternatively, a user may specify that the population component 914 only retrieve PIOs 502 corresponding to sporting events. Of course, those skilled in the art recognize that various other filtering criteria 1406 may be used, including logical operators (e.g., AND, OR, NOT) and the like.

The filtering component 1402 may also be used within an STB 102 to divide the initial set 1404 based on different criteria, such as the genres of the respective television programs, in order to transmit PIOs 502 or information from PIOs 502 to auxiliary devices such as pagers, PDAs, personal computers, or telephone handsets that can receive information and display it for the user.

As illustrated in FIG. 14, suppose PIOs 502 belong to the initial set 1404. The population component 914 applies the filtering criteria 1406 (e.g., primetime) to each PIO 502. The PIOs 502 that match the filtering criteria 1406 (e.g., PIO 502a,e) are retrieved from the source and stored in the STB 102. As previously described, the display component 702 may then display the corresponding visual indicators 508a–b on the television 104.

The filtering component 1402 may also be used internally within an STB 102 to organize the selected set 1405. For example, a user may further divide the set 1405 based on different criteria 1406, such as the genres of the respective television programs. This allows the user to organize the PIOs 502 using logical folders or the like.

Figure 15:
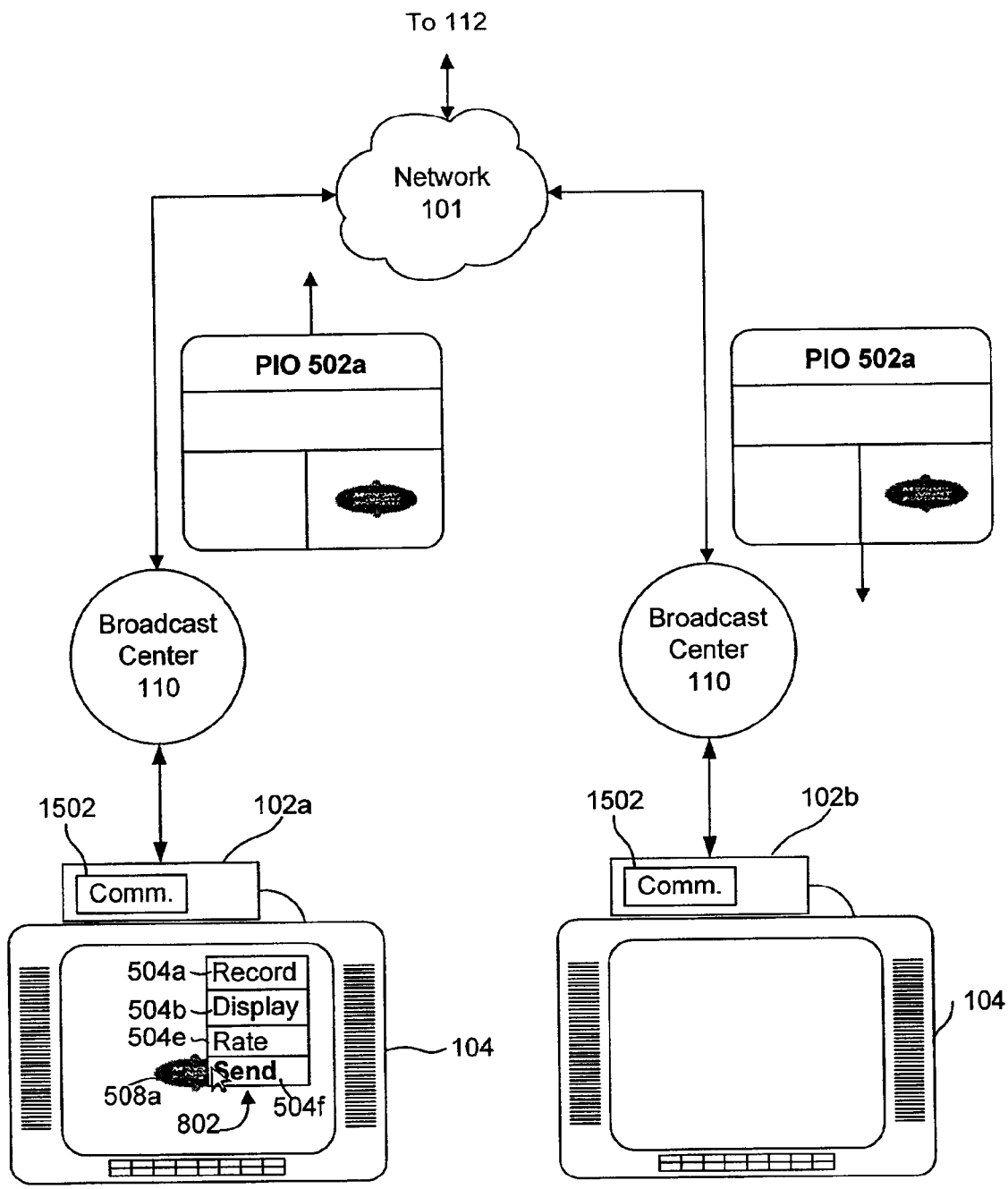
FIG. 15 is a block diagram illustrating transmission of PIOs between entertainment systems.

As shown in FIG. 15, PIOs 502 may be transmitted from one system to another. For example, a PIO 502a within a first STB 102a may be transmitted via the network 101 to second STB 102b. Of course, other networks may be used, such as telephone and satellite networks (not shown). Additionally, PIOs 502 may be communicated between a variety of electronic devices, including personal computers, PDAs, telephones, cell phones, pagers, and the like.

In one embodiment, a communication component 1502 is provided within each STB 102ab or other systems or devices. The communication component 1502 may be embodied by various standard communication tools, such as Web browsers, e-mail clients, or the like. Moreover, various communication protocols may be used, such as HTTP, FTP, SMTP, IMAP, which are well known to those skilled in the art.

In the illustrated embodiment, a user of the source STB 102a may select the visual indicator 508a of PIO 502a. Thereafter, the user may select, for example, the send action 504f from the context-sensitive menu 802. The send action 504f may include code for interacting with the communication component 1502 to transmit a copy of the PIO 502a to the destination STB 102b.

Alternatively, a PIO 502 may be communicated through the use of portable computer-readable media, such as CD-ROMs, diskettes, memory cards, memory sticks, and the like. In one embodiment, the PIO 502, or a copy thereof, is placed on a computer-readable medium by a source system. Thereafter, the computer-readable medium is provided to the destination system, where it is read into memory 306 and/or a storage device 310.

FIGS. 16–24 are high-level block diagrams illustrating various techniques for managing television programs using linked PIOs 502. While the following description makes particular reference to STBs 102, the invention is not limited to STBs 102 or interactive television systems 200 generally. A wide variety of devices may use, transport, create, or otherwise process PIOs 502, examples of which include personal computers, PDAs, webpads, etc.

Figure 16:
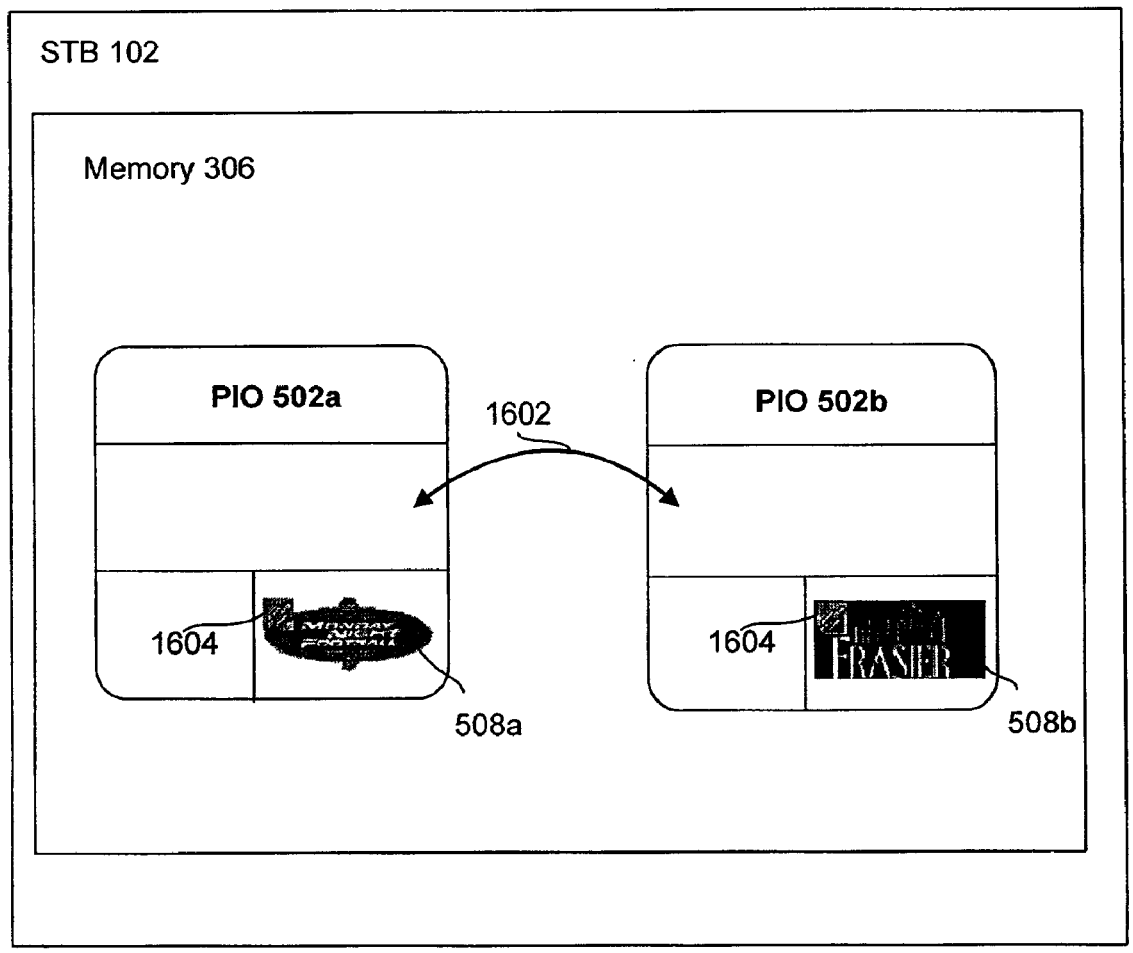
FIG. 16 is a block diagram illustrating linked PIOs within an entertainment system.

As shown in FIG. 16, two PIOs 502 may be stored and linked within memory 306 of an STB 102. For example, PIOs 502a–b may be linked by a link 1602 to form an association between a first PIO 502a and a second PIO 502b. In certain embodiments, the link 1602 is bi-directional (as indicated by the arrows). With a bi-directional link 1602, operations performed in connection with a first PIO 502 may be performed on the linked PIO 502 and vice versa.

The association formed by the link 1602 allows for the PIOs 502a–b to be treated as a group or separately as desired. The existence of a link 1602 may be made known to a user by modifying the visual indicators 508a–b to include a link indicator 1604. The link indicator 1604 may be an icon, graphic, text, or the like which provides a visual cue in a user interface (not shown) that a PIO 502 is linked to other PIOs 502. Of course the link indicator 1604 may comprise an audio indicator which may be activated when the PIO 502 is selected.

Figure 17:
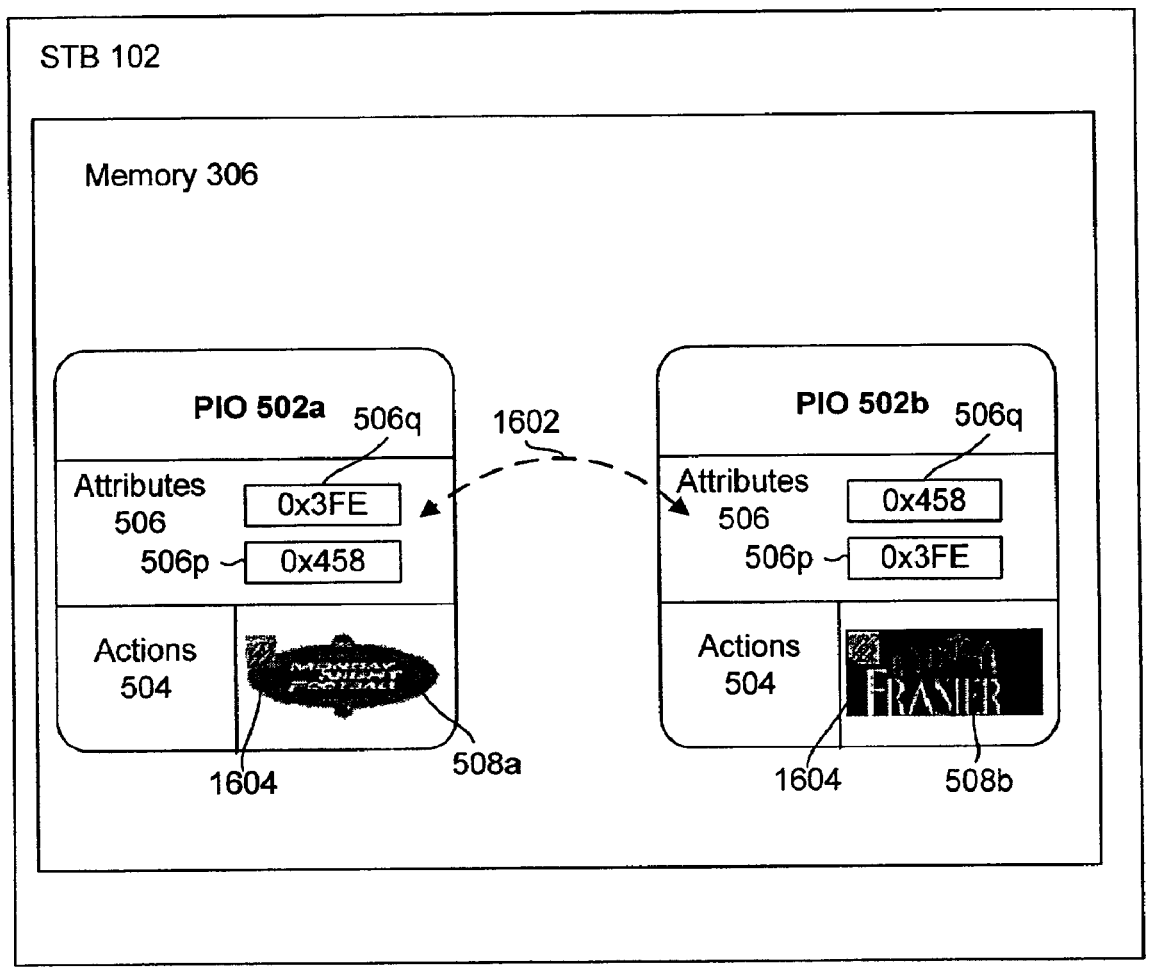
FIG. 17 is a block diagram illustrating PIOs being linked based on PIO attributes.
Figure 18:
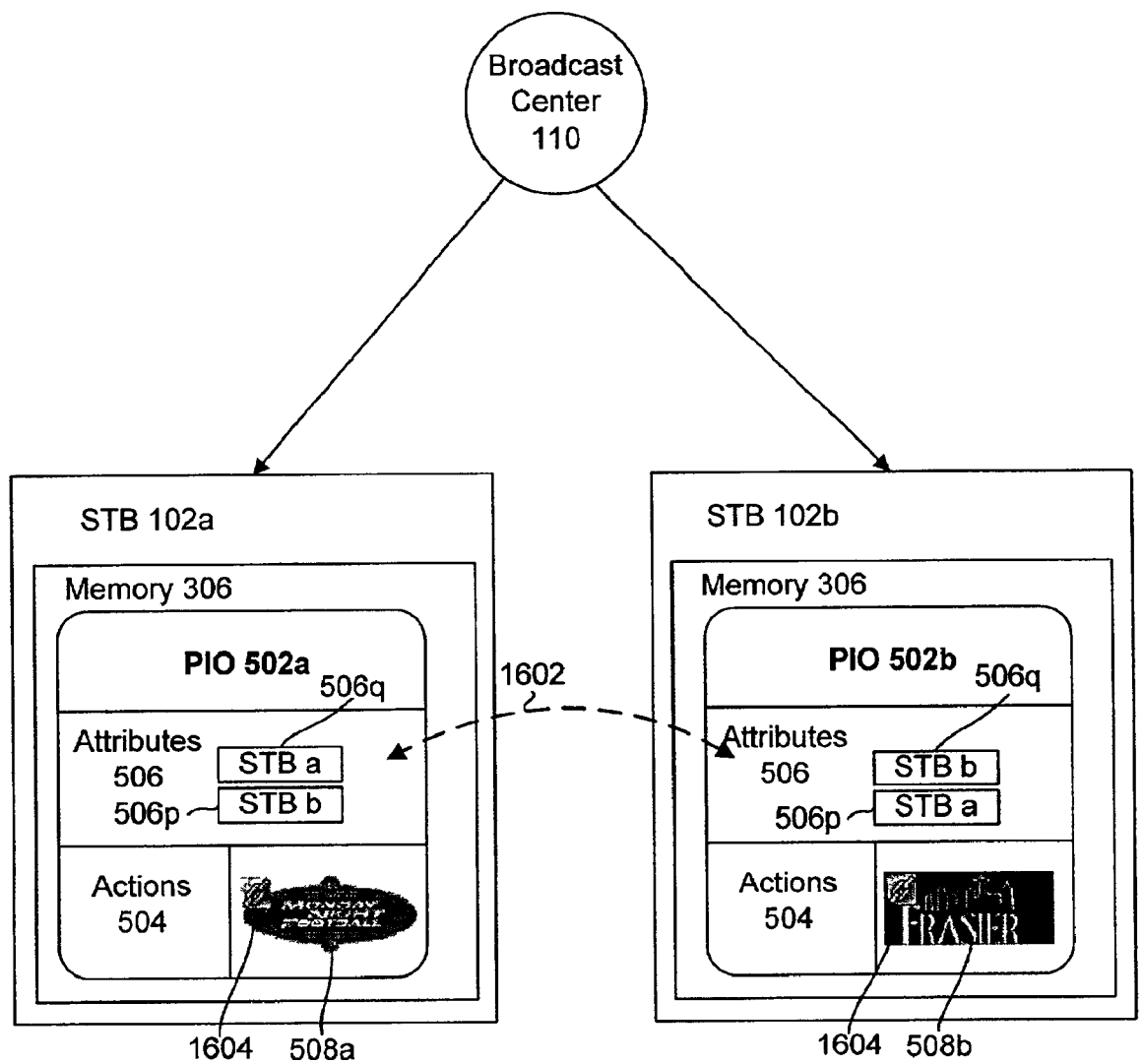
FIG. 18 is a block diagram illustrating linked PIOs stored in different entertainment systems.
Figure 19:
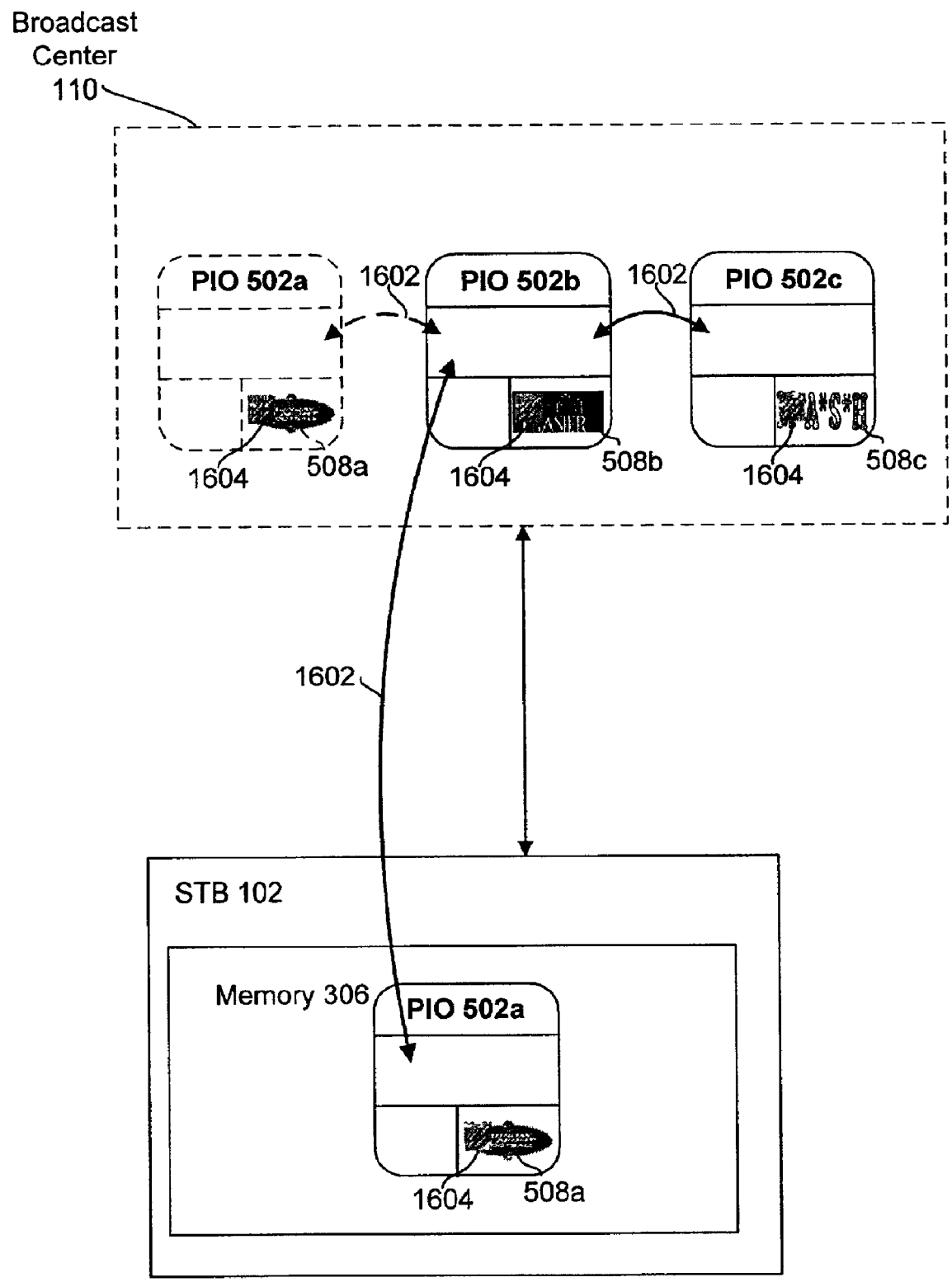
FIG. 19 is a block diagram illustrating transmission and retrieval of linked PIOs.

The link 1602 may be implemented in a variety of ways well known to those of skill in the art. In one embodiment, as shown in FIG. 17, a link 1602 is implemented as an attribute 506 of a PIO 502. The attribute 506 may be a reference 506p, i.e. pointer, which holds an address of the PIO 502 to which a particular PIO 502. The address may be a meta-data attribute of the linked PIO 502 such as a PIO ID 506q which uniquely identifies that PIO 502.

For example, the PIO ID 506q may correspond to a memory address where the PIO 502 is stored in memory 306. Reference 506p of PIO 502a includes the hexadecimal address "0x458" which is the PIO ID 506q of PIO 502b corresponding to the memory address where PIO 502b is stored. Similarly, the reference 506p of PIO 502b includes the address "0x3FE" corresponding to PIO ID 506q and the memory address for PIO 502a.

Generally, the reference 506p indicates the location of the linked PIO 502. Of course, the reference 506p may point, or link, to a PIO 502 stored in a different entertainment device. In certain configurations, the reference may comprise a Uniform Resource Locator (URL), file name, memory location, or the like. For example, in FIG. 18, a first STB 102a stores PIO 502a while a second STB 102b stores PIO 502b. The PIOs 502a–b may be linked remotely through a broadcast center 110. Of course the linked PIOs 502 may be stored on any of the nodes within the network 101, or the Internet 112.

In the depicted embodiment, the references 506p store the PIO IDs 506q. The PIO IDs 506q identify the entertainment device STB 102a–b in which the PIO 502a–b is stored. For example, within PIO 502a, the reference 506p is "STB b." The linked PIO 502b includes a PIO ID 506q which is equal to the reference 506p "STB b" indicating that the link 1602 is to a PIO 502b stored on "STB a." Similarly, PIO 502b stores a reference 506p for the return link 1602 to PIO 502a In addition, the PIO IDs 506q may include a memory address within the referenced STBs 102.

In certain embodiments, the reference 506p and corresponding PIO IDs 506q may always include a device identifier, memory address, and possibly a network identifier such that the link 1602 includes all the information necessary to locate and perform an operation in connection with the linked PIO 502. Of course those of skill in the art recognize that the link 1602 may include minimal information which may be used with a "look-up" table or other information server connected to the network 101 to resolve the link 1602 to the actual location of the PIO 502.

Linking PIOs 502 allows for a variety of actions 504 to be performed on the linked PIOs 502 as a group or individually as needed. For example, in FIG. 19, transmitting and retrieving of PIOs 502 may utilize the links 1602 to perform the operation on a group rather than separately on each PIO 502.

Suppose a broadcast center 110 stores a plurality of linked PIOs 502a–c. A first PIO 502a may be selected for transmission to an STB 102. Accordingly, the first PIO 502a may be transmitted. Consequently, based on the link 1602 between PIO 502a and PIO 502b, PIO 502b may also be transmitted to the STB 102. Similarly, the link 1602 may be used to transmit PIO 502c to the STB 102. Therefore, rather than selecting, or otherwise designating each PIO 502a–c to be transmitted, a single PIO 502a may be designated and a whole set of linked PIO 502 may be automatically transmitted to the STB 102.

Similarly, a user may control when linked PIOs 502 are delivered to the STB 102. For example, a user may select a PIO 502a stored on the STB 102. The user may then request that one or more PIOs 502b–c linked to the selected PIO 502a be retrieved. Accordingly, the STB 102 may determine whether linked PIOs 502b–c are stored on the STB 102. If not, the STB 102 may store the PIOs 502b–c retrieved from the broadcast center 110.

Of course the linked PIOs 502b–c may be stored on multiple devices coupled to the network 101. Each device may be accessed to retrieve the linked PIOs 502b–c. In one embodiment, based on the link 1602, the STB 102 may establish a network connection with a PIO server (not shown) storing one or more linked PIOs 502. The STB 102 may then receive one or more linked PIOs 502 from the PIO server.

In addition, or in the alternative, other actions 504 may be performed in connection with one or more linked PIOs 502. For example, a user may select a PIO 502 and an action 504 to be performed on the PIO 502 and/or the television program associated with the PIO 502. An STB 102 may then determine that the PIO 502 is linked to one or more other PIOs 502 and prompt the user whether to perform the action 504 on one or more linked PIO 502. If the user requests that the action 504 be performed on linked PIOs 502, the STB 102 may execute the action 504 on the selected PIO 502, then the STB 102 may perform the action 504 on the one or more linked PIOs 502. In other embodiments, the STB 102 may not prompt the user, but may simply perform the action 504 on linked PIOs 502.

By way of example, suppose multiple PIOs 502 are linked and stored within a user's STB 102. Additionally, suppose the PIOs 502 are linked because they represent a mini-series of televisions programs scheduled to be broadcast. The user may execute a record action 504a on the first PIO 502. Recognizing that the first PIO 502 is linked, the STB 102 may ask if the user wants to record 504a television programs associated with one or more of the linked PIOs 502, to which the user may respond affirmatively. Thus, the user need not individually request a record action 504a for each PIO 502. The links 1602 allow the group of PIOs 502 to perform the action 504 in one user command sequence.

Figure 20:
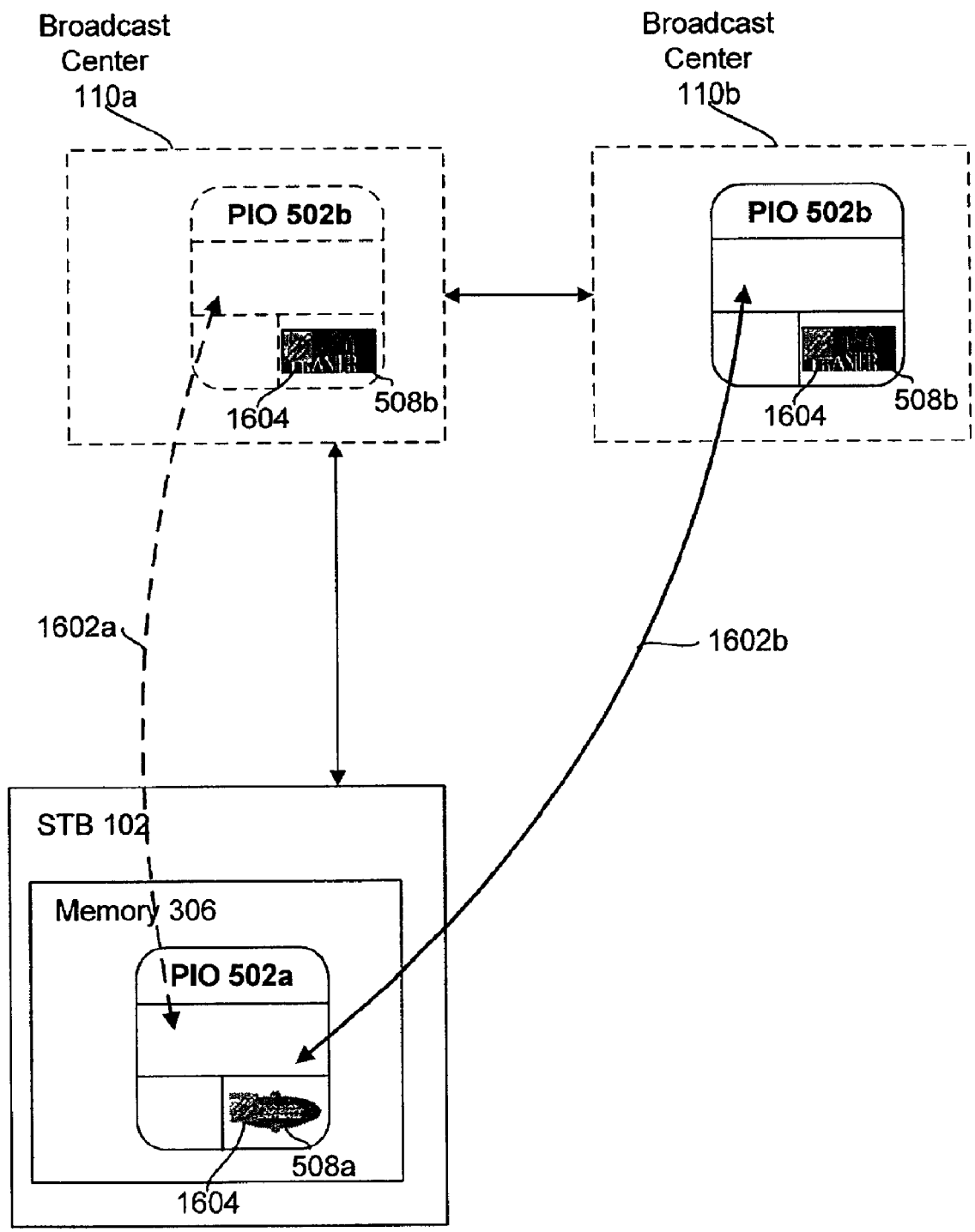
FIG. 20 is a block diagram illustrating management of PIO links when a linked PIO is moved or deleted.

As shown in FIG. 20, a link 1602 may be maintained, updated, or deleted, based on changes to the location or existence of a linked PIO 502. For example, suppose PIO 502a stored in STB 102 is linked 1602a to PIO 502b, which is stored in broadcast center 110a. In one embodiment, the STB 102 determines that PIO 502b has been deleted (indicated by dashed lines). Accordingly, the link 1602a may be modified by the STB 102 to point to a different PIO 502 or to point to nothing, e.g. a null pointer.

Similarly, if a linked PIO 502 is moved, the PIOs 502 linked to the moved PIO 502 may be updated to point to the PIO 502 at the new location. For example, if PIO 502b is linked to PIO 502a and PIO 502b is moved from broadcast center 110a to broadcast center 110b, in one embodiment, the STB 102 determines that PIO 502b has been moved. Accordingly, the link 1602a may be updated to become link 1602b which points to PIO 502b at broadcast center 110b.

Of course, management of links 1602 (changing links 1602 when PIOs 502 are moved or deleted) may be performed by various different modules separately or collectively. Those of skill in the art recognize the link management may be accomplished in a variety or ways, each of which is considered within the scope of the present invention. In one embodiment, an STB 102 or other client terminal may maintain links for PIOs 502 stored therein. Alternatively, a PIO server or link maintenance server may manage PIO links 1602 within a sub-set of a network 101.

Figure 21:
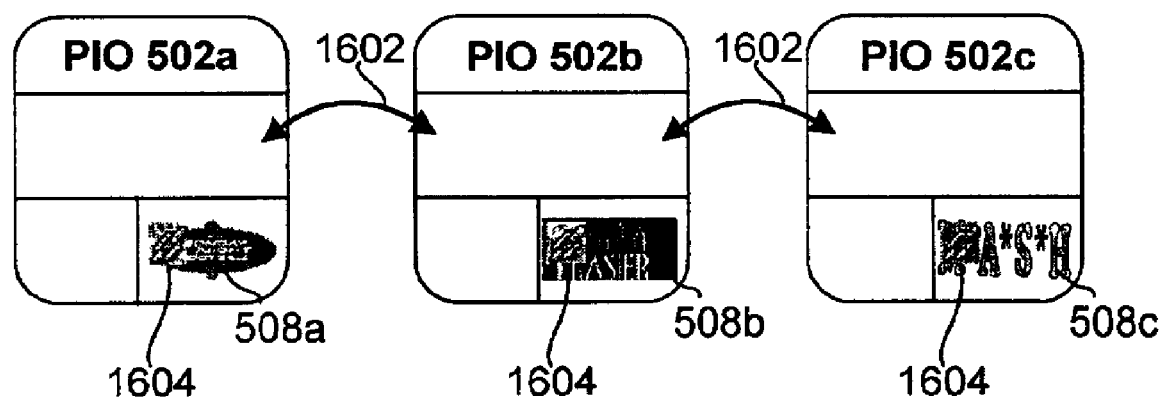
FIG. 21 is a block diagram illustrating linked PIOs arranged in a chain configuration.
Figure 22:
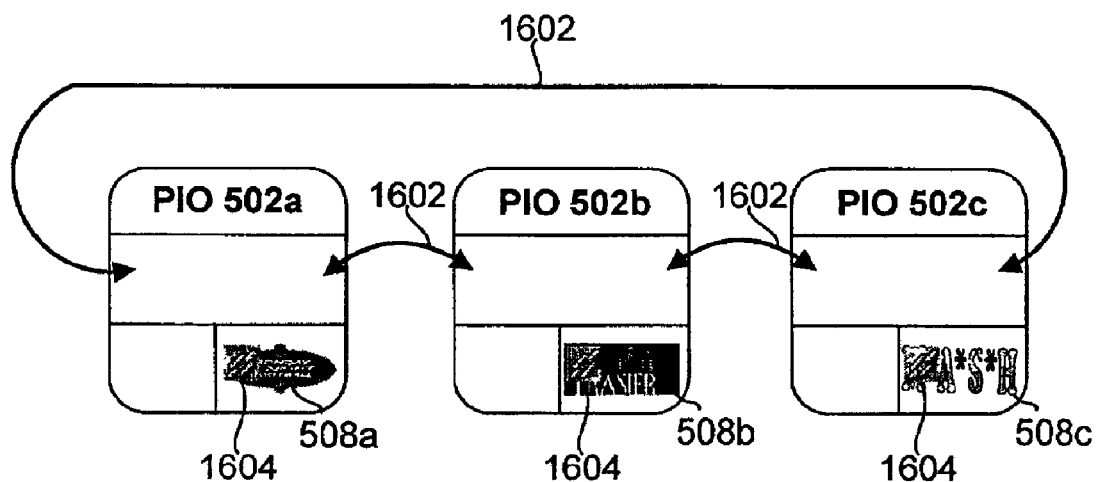
FIG. 22 is a block diagram illustrating linked PIOs arranged in a ring configuration.
Figure 23:
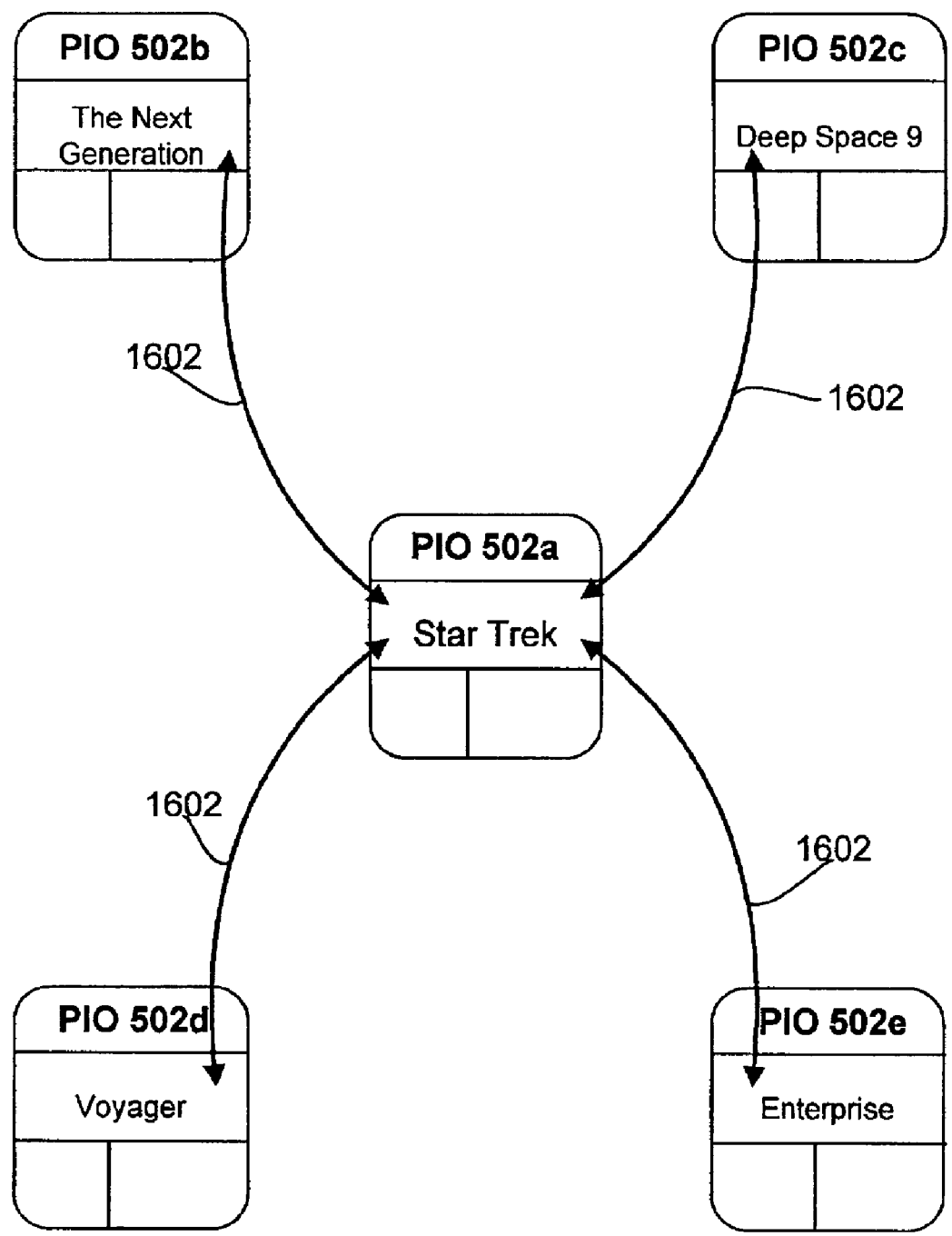
FIG. 23 is a block diagram illustrating linked PIOs arranged in a star configuration.

As shown in FIGS. 21, 22, and 23, PIOs 502 may be linked in a variety of configurations. Different configurations are possible because a single PIO 502 may be linked to a number of PIOs 502. In certain embodiments, each PIO 502 may be linked to at least two different PIOs 502. A particular configuration may be more advantageous depending on the purpose for linking, or grouping the PIOs 502. As shown in FIG. 21, the PIOs 502 may be linked in a "chain" configuration. The chain may include a first PIO 502a, a last PIO 502c and one or more intermediate PIOs 502b. A chain configuration may be useful for linking PIOs 502 associated with television programs in a mini-series, a syndicated set of episodes, or movie sequels. Alternatively, a chain may be useful for creating favorites lists of PIOs 502, discussed in more detail below.

Alternatively, as shown in FIG. 22, the PIOs 502 may be linked according to a ring configuration. In a ring configuration, the PIOs 502 are linked sequentially such that, from any PIO 502 in the ring, links 1602 may be followed to only two different PIOs 502. For example, from PIO 502a a link 1602 may be followed to PIO 502b, or a second link 1602 may be followed to PIO 502c.

A ring configuration may be used to propagate a display action 504b through a set of linked PIOs 502. For example, a user may link a number of PIOs 502 for multiple pre-recorded children's television programs in a ring configuration. A first program associated with the first PIO 502a may be displayed. Once the last PIO 502c in the ring is displayed, the STB 102 may automatically begin again displaying the program associated with the first PIO 502a.

In one embodiment, shown in FIG. 22, PIOs 502 are linked in a star configuration. The star configuration may be useful for linking television programs which are closely related, or off-shoots from other shows. For example, a PIO 502 for a successful television program may be the center of the star. The center PIO 502 may be linked to other shows which were created using characters from the center television program. For example, a center PIO 502 may represent "Star Trek." The PIOs 502 linked to the main PIO 502 may be shows such as "Star Trek: The next generation," "Star Trek: Deep Space Nine," "Star Trek: Voyager," and "Enterprise." Thus, a user may easily perform actions 504 on these PIOs 502 for related television programs.

Figure 24:
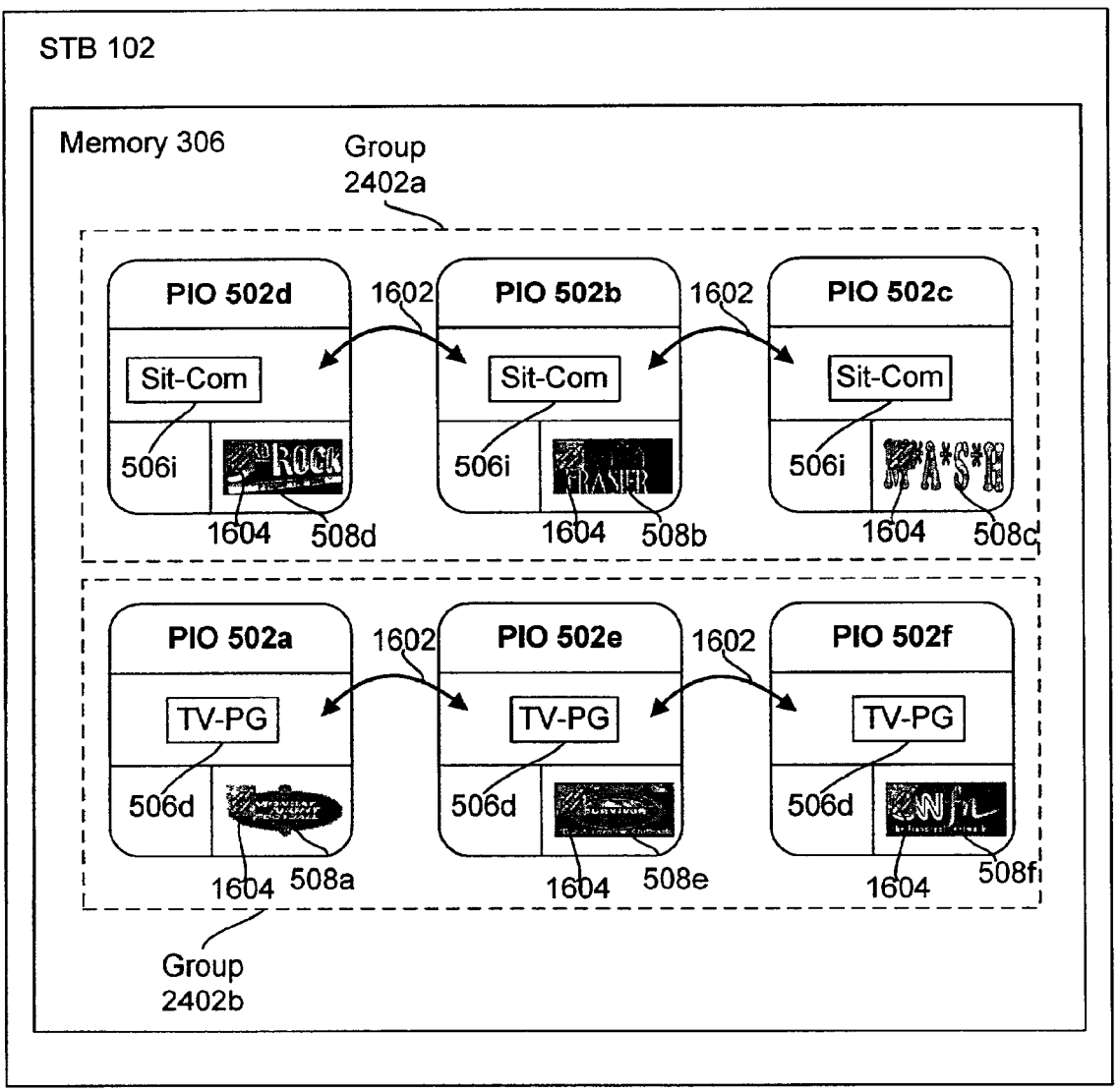
FIG. 24 is a block diagram illustrating linked PIOs arranged according to groups.

As shown in more detail in FIG. 24, links 1602 provide a user, as well as television programmers, and distributors, with an effective way to group PIOs 502. The PIOs 502 may be grouped for distribution, recording, displaying, and/or a variety of other actions 504 which may be performed in connection with a PIO 502.

In one embodiment, multiple PIOs 502 may be linked in groups 2402 based on a variety of different criteria. For example, one group 2402a may comprise PIOs 502b–d which are linked based on a common genre attribute 506i. Alternatively, another group 2402b may include PIOs 502a–e–f linked based on a rating attribute 506d., e.g., "TV-PG".

In other embodiments, users may compose a group 2402 of linked PIOs 502 based on user-defined criteria. The groups 2402 may be a user's "favorites list" (groupings of favorite television programs). These groups 2402 may be distributed between friends and family.

Users may create groups 2402 by establishing links 1602 between two PIOs 502 based on their own criteria. Similarly, celebrities or other individuals may compose groups 2402. For example, Oprah Winfrey may compose and maintain a group 2402 including her favorite drama shows. These celebrity composed groups 2402 may be copied and distributed based on user interest.

A user may copy or purchase a group 2402 and execute an action 504 on the group 2402. For example, the group 2402 may include television programs being displayed at different times on a single day and on different channels. The user may simply execute the display action 504b on the group 2402. Accordingly, as each show ends, the STB 102 uses to links 1602 and PIOs 502 in the group 2402 to automatically change the channel for the television program associated with the next linked PIO 502.

In addition, groups 2402 may be used to manage operations within an STB 102. For example, one group 2402 may consist of PIOs 502 associated with previously recorded television programs. Each PIO 502 within the group 2402 may be checked by the STB 102, prior to recording a new television program, to ensure that a PIO 502 for the program to be recorded is not in the group 2402. If the PIO 502 exists within the group 2402, the STB 102 may not record the program to avoid creating a duplicate recording.

Figure 25:
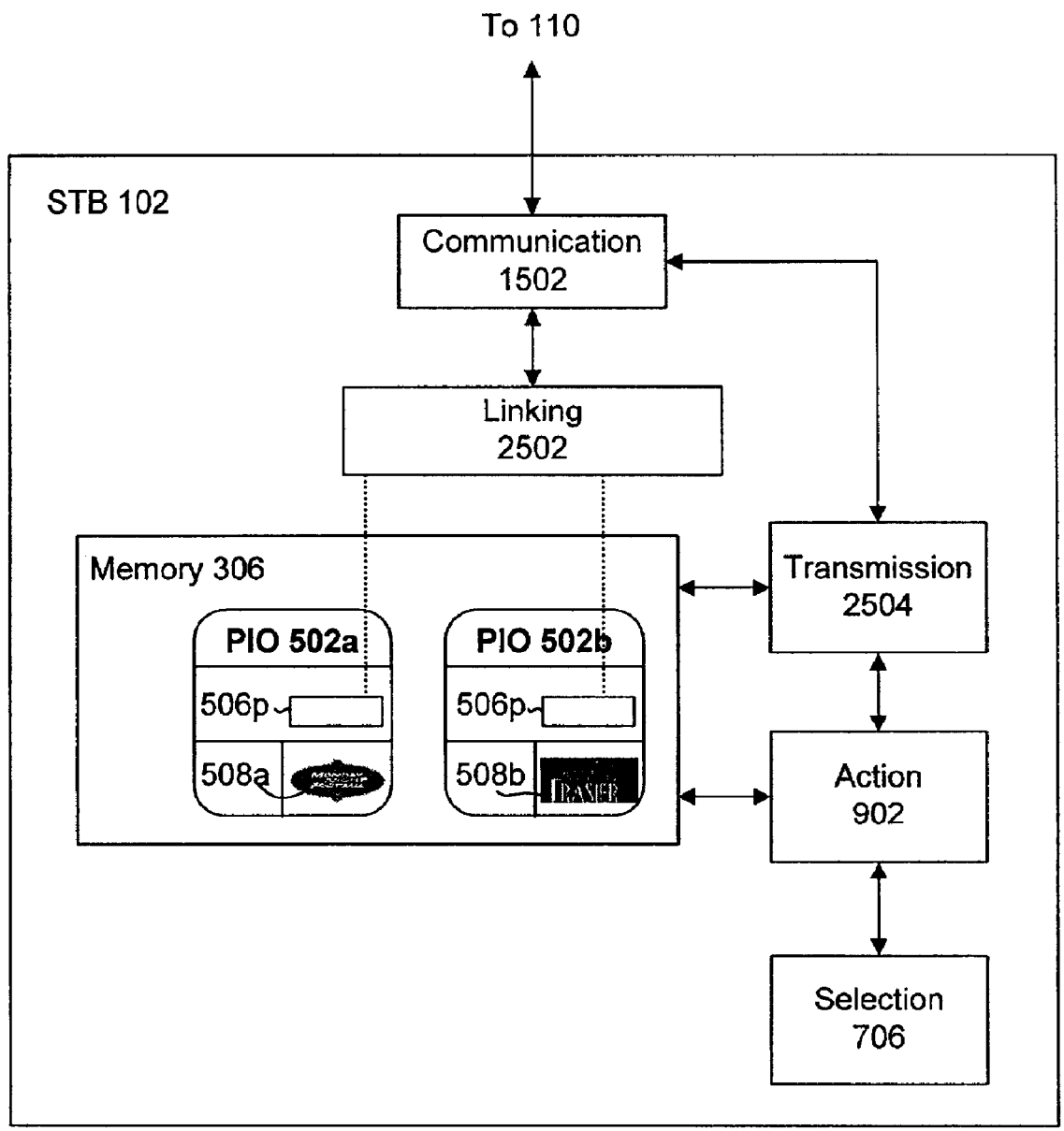
FIG. 25 is a block diagram of a system for managing linked PIOs.

FIG. 25 illustrates one embodiment of a system 2500 for managing television programs within an entertainment system 200. The system 2500 may includes, for instance, a selection component 706, an action component 902 and a communication component 1502, as described above in connection with FIGS. 7, 9 and 15. These components 706, 902, 1502 may be adapted to manage and use links 1602 between PIOs 502. The system 2500 further includes one or more PIOs 502a–b stored on a computer-readable medium, such as a memory 306.

In certain embodiments, the system includes a linking component 2502. The linking component 2502 establishes the link 1602 (as illustrated by the dashed line). As discussed above in relation to FIGS. 17 and 18, the linking component 2502 may create a reference attribute 506p which holds an address for the linked PIO 502. Of course, the link 1602 may be one-way or bi-directional. For example, in one embodiment, PIO 502a may be linked to PIO 502b but PIO 502b may not be linked to PIO 502a.

The linking component 2502 may be coupled to the communication component 1502 to obtain information necessary to update or delete links 1602 when linked PIOs 502 are moved or deleted, as discussed in relation to FIG. 20.

The system 2500 may include a transmission component 2504 configured to transmit and/or retrieve two or more linked PIOs 502 using the communication component 1502. The action component 902 may receive a PIO selection from the selection component 706 and execute a selected action 504 on the selected PIO 502 and one or more linked PIOs 502, as described above.

Based on the foregoing, the present invention offers a number of advantages not available in conventional approaches. The present invention allows users to quickly and efficiently access television programming within an entertainment system without the need for a conventional, grid-based EPG 402. PIOs 502 may be organized according to user-specified criteria and transmitted between various types of entertainment systems and devices. Television programs may be recorded and played back while shielding a user from the details of the program's broadcast time and channel.

While specific embodiments and applications of the present invention have been illustrated and described, it is to be understood that the invention is not limited to the precise configuration and components disclosed herein. Various modifications, changes, and variations apparent to those skilled in the art may be made in the arrangement, operation, and details of the methods and systems of the present invention disclosed herein without departing from the spirit and scope of the invention.

What is claimed is:

1. A method for providing access to television programs and related information, the method comprising:

storing program interface objects (PIOs) within at least two set top boxes, each PIO comprising a plurality of attributes carrying information about a television program, a plurality of user-selectable actions performable by the set top boxes in connection with the television program, and at least one visual indicator displayable in a graphical user interface (GUI) to facilitate user interaction with the PIO;

linking the stored PIOs, such that an operation performed in connection with one PIO in one set top box may also be performed in connection with the other PIO in each of the other set top boxes.

2. The method of claim 1, further comprising:
receiving a user selection of a stored PIO for transmission to another set top box;
transmitting the selected PIO to the other set top box; and
transmitting a PIO linked to the selected PIO to the other set top box.

3. The method of claim 1, further comprising:
receiving a user selection of an action associated with a stored PIO;
executing the selected action in connection with the stored PIO; and
executing the selected action in connection with a PIO linked to the stored PIO.

4. The method of claim 1, further comprising:
receiving a user selection of a stored PIO;
determining whether a PIO linked to the selected PIO is stored in the set top box;
in response to a linked PIO not being stored in the set top box, retrieving the linked PIO; and
storing the retrieved PIO in the set top box.

5. The method of claim 4, wherein retrieving comprises:
establishing a network connection with a PIO server storing the linked PIO;
receiving the linked PIO via the network connection.

6. The method of claim 1, further comprising:
modifying a visual indicator of a PIO to provide a visual cue to a user that the PIO is linked to another PIO.

7. The method of claim 1, wherein linking comprises:
storing within a first PIO a reference to a second PIO.

8. The method of claim 7, wherein linking further comprises:
storing within the second PIO a reference to the first PIO.

9. The method of claim 7, wherein the reference is an attribute of the first PIO.

10. The method of claim 7, wherein the reference comprises a Uniform Resource Locator (URL).

11. The method of claim 7, wherein the reference comprises a file name.

12. The method of claim 7, wherein the reference comprises a memory location.

13. The method of claim 7, further comprising:
determining that a second PIO linked to a first PIO has been moved to a new location; and
updating the reference in the first PIO to reference the new location of the second PIO.

14. The method of claim 7, further comprising:
determining that a second PIO linked to a first PIO has been deleted; and
removing the reference in the first PIO referring to the second PIO.

15. The method of claim 1, wherein at least one PIO is linked to at least two different PIOs.

16. The method of claim 1, wherein the at least two PIOs are linked according to a ring configuration.

17. The method of claim 1, wherein the at least two PIOs are linked according to a chain configuration.

18. The method of claim 1, wherein at least four PIOs are linked according to a star configuration.

19. The method of claim 1, wherein a first PIO is linked to a second PIO, the second PIO being stored within a different set top box.

20. The method of claim 1, wherein the at least two PIOs are linked according to genre.

21. The method of claim 1, wherein the at least two PIOs are linked according to a rating for the associated television programs.

22. The method of claim 1, wherein the at least two PIOs are linked according to user-defined criteria.

23. The method of claim 1, wherein the at least two linked PIOs correspond to television programs that have been previously recorded.

24. The method of claim 1, wherein the PIO is selected from the group consisting of a JavaBean object, a Distributed Component Object Model (DCOM) object, and an extensible Markup Language (XML) object.

25. The method of claim 1, wherein the set top box comprises an interactive television (ITV) system.

26. A system for providing access to television programs and related information, the system comprising:
at least two set top boxes, each set top box including:
a computer-readable medium that stores a program interface object (PIO) comprising a plurality of attributes carrying information about a television program, a plurality of user-selectable actions performable by an entertainment system in connection with the television program, and at least one visual indicator displayable in a graphical user interface (GUI) to facilitate user interaction with the PIO; and
a linking component that links the PIO with a PIO in another set top box, such that an operation performed in connection with one PIO may also be performed in connection with the other PIO.

27. The system of claim 26, wherein each set top box further comprises:
a selection component that receives a user selection of a stored PIO for transmission to another set top box; and
a transmission component that transmits the selected PIO and a PIO linked to the selected PIO to the other set top box.

28. The system of claim 26, wherein each set top box further comprises:
a selection component that receives a user selection an action associated with a stored PIO; and
an action component that executes the selected action in connection with the stored PIO and in connection with a PIO linked to the stored PIO.

29. The system of claim 26, wherein each set top box further comprises:
a selection component that receives a user selection of a stored PIO; and
a communication component that, in response to determining that a PIO linked to the selected PIO is not stored in the set top box, retrieves and stores the linked PIO in a storage device of the set top box.

30. The system of claim 29, wherein the communication component establishes a network connection with a PIO server storing the linked PIO and receives the linked PIO via the network connection.

31. The system of claim 26, wherein the linking component is configured to modify a visual indicator of a linked PIO to provide a visual cue to a user that the PIO is linked to another PIO.

32. The system of claim 26, wherein the linking component stores within a first PIO a reference to a second PIO.

33. The system of claim 32, wherein the linking component stores within the second PIO a reference to the first PIO.

34. The system of claim 32, wherein the reference is an attribute of the first PIO.

35. The system of claim 32, wherein the reference comprises a Uniform Resource Locator (URL).

36. The system of claim 32, wherein the reference comprises a file name.

37. The system of claim 32, wherein the reference comprises a memory location.

38. The system of claim 32, wherein the linking component, in response to a determination that a second PIO linked to a first PIO has been moved to a new location, updates the reference in the first PIO to reference the new location of the second PIO.

39. The system of claim 32, wherein the linking component, in response to a determination that a second PIO linked to a first PIO has been deleted, removes the reference in the first PIO referring to the second PIO.

40. The system of claim 26, wherein at least one PIO is linked to at least two different PIOs.

41. The system of claim 26, wherein the at least two PIOs are linked according to a ring configuration.

42. The system of claim 26, wherein the at least two PIOs are linked according to a chain configuration.

43. The system of claim 26, wherein at least four PIOs are linked according to a star configuration.

44. The system of claim 26, wherein a first PIO is linked to a second PIO, the second PIO being stored within a different set top box.

45. The system of claim 26, wherein the at least two PIOs are linked according to genre.

46. The system of claim 26, wherein the at least two PIOs are linked according to a rating for the associated television programs.

47. The system of claim 26, wherein the at least two PIOs are linked according to user-defined criteria.

48. The system of claim 26, wherein the at least two linked PIOs correspond to television programs that have been previously recorded.

49. The system of claim 26, wherein the PIO is selected from the group consisting of a JavaBean object, a Distributed Component Object Model (DCOM) object, and an eXtensible Markup Language (XML) object.

50. The system of claim 26, wherein the set top box comprises an interactive television (ITV) system.

* * * * *

UNITED STATES PATENT AND TRADEMARK OFFICE
CERTIFICATE OF CORRECTION

PATENT NO. : 6,915,528 B1  Page 1 of 1
APPLICATION NO. : 09/993350
DATED : July 5, 2002
INVENTOR(S) : Thomas P. McKenna, Jr.

It is certified that error appears in the above-identified patent and that said Letters Patent is hereby corrected as shown below:

Column 2, line 56, ". . . such as interactive . . ." change to --such as an interactive--

Column 4, line 25, ". . . or "in an embodiment" . . ." change to --and "in an embodiment"--

Column 5, line 59, ". . . into a robotic tape . . ." change to --into robotic tape--

Column 9, line 8, ". . . is not in interested . ." change to --is not interested--

Column 9, line 9, ". . . on Channel 498." change to --on Channel 498.--

Column 9, line 15, ". . . like instruct the . . ." change to --like to instruct the--

Column 9, line 55, ". . . within a STB . . ." change to --within an STB--

Column 10, line 19, ". . . an extensible Markup . . ." change to --an eXtensive Markup--

Column 10, line 62, ". . . language 5060, etc." change to --language 506o, etc.--

Signed and Sealed this

Sixteenth Day of January, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,915,528 B1 | Page 1 of 2 |
| APPLICATION NO. | : 09/993350 | |
| DATED | : July 5, 2005 | |
| INVENTOR(S) | : Thomas P. McKenna, Jr. | |

It is certified that error appears in the above-identified patent and that said Letters Patent is hereby corrected as shown below:

Column 2, line 56, ". . . such as interactive . . ." change to --such as an interactive--

Column 4, line 25, ". . . or "in an embodiment" . . ." change to --and "in an embodiment"--

Column 5, line 59, ". . . into a robotic tape . . ." change to --into robotic tape--

Column 9, line 8, ". . . is not in interested . ." change to --is not interested--

Column 9, line 9, ". . . on Channel 498." change to --on Channel 498.--

Column 9, line 15, ". . . like instruct the . . ." change to --like to instruct the--

Column 9, line 55, ". . . within a STB . . ." change to --within an STB--

Column 10, line 19, ". . . an extensible Markup . . ." change to --an eXtensive Markup--

Column 10, line 62, ". . . language 5060, etc." change to --language 506$o$, etc.--

Column 11, line 63, ". . . an action 504$b$ for . . ." change to --an action 504$c$ for--

Column 12, line 7, ". . . user may selection the . . ." change to --user may select the--

Column 12, line 8, ". . . action 502$a$ of. . ." change to --action 504$a$ of--

Column 12, line 11, ". . . same action 506$a$ may . . ." change to --same action 504$a$ may--

Column 12, line 59, ". . . indicators 50$a$-$f$ in any . . ." change to --indicators 508$a$-$f$ in any--

Column 16, line 8, ". . . each STB 102$ab$ or . . ." change to --each STB 102$a$-$b$ or--

Column 16, line 13, ". . . SMTP, IMAP, which . . ." change to --SMTP, and IMAP, which--

UNITED STATES PATENT AND TRADEMARK OFFICE
CERTIFICATE OF CORRECTION

PATENT NO. : 6,915,528 B1
APPLICATION NO. : 09/993350
DATED : July 5, 2005
INVENTOR(S) : Thomas P. McKenna, Jr.

Page 2 of 2

It is certified that error appears in the above-identified patent and that said Letters Patent is hereby corrected as shown below:

Column 17, line 18, "... STB 102*a-b* in which the PIO 502*a-b* is stored ..." change to --STBs 102*a-b* in which the PIO 502*a-b* are stored--

Column 18, line 8, "... more linked PIO..." change to --more linked PIOs--

Column 19, line 42, "... 502*a-e-f* linked ..." change to --502*a,e,f* linked--

Column 19, line 42, "... attribute 506*d*., e.g., ..." change to --attribute 506*d*, e.g.,--

Column 20, line 10, "... may includes, for ..." change to --may include, for--

Column 22, line 17, "... extensive Markup Language ..." change to --eXtensive Markup Language--

Column 22, line 45, "... a user selection an ..." change to --a user selection and--

This certificate supercedes Certificate of Correction issued January 16, 2007.

Signed and Sealed this

Sixth Day of February, 2007

JON W. DUDAS
*Director of the United States Patent and Trademark Office*